(12) United States Patent
Miyabe et al.

(10) Patent No.: US 10,713,292 B2
(45) Date of Patent: Jul. 14, 2020

(54) DOCUMENT ANALYSIS APPARATUS AND DOCUMENT ANALYSIS PROGRAM

(71) Applicants: KABUSHIKI KAISHA TOSHIBA, Minato-ku (JP); TOSHIBA SOLUTIONS CORPORATION, Kawasaki-shi (JP)

(72) Inventors: Yasunari Miyabe, Chofu (JP); Kazuyuki Goto, Kawasaki (JP); Shigeru Matsumoto, Nishitokyo (JP); Saori Nitta, Fuchu (JP); Shozo Isobe, Kawasaki (JP); Seiji Egawa, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 950 days.

(21) Appl. No.: 14/851,687

(22) Filed: Sep. 11, 2015

(65) Prior Publication Data
US 2016/0055238 A1     Feb. 25, 2016

Related U.S. Application Data

(63) Continuation of application No. PCT/JP2013/057300, filed on Mar. 14, 2013.

(51) Int. Cl.
*G06F 16/35*     (2019.01)
*G06F 16/93*     (2019.01)

(52) U.S. Cl.
CPC ............ *G06F 16/353* (2019.01); *G06F 16/93* (2019.01)

(58) Field of Classification Search
CPC .................................................. G06F 16/353
See application file for complete search history.

(56) References Cited

U.S. PATENT DOCUMENTS

| 2011/0179009 A1* | 7/2011 | Nam | G06Q 30/02 |
| | | | 707/708 |
| 2013/0018824 A1* | 1/2013 | Ghani | G06N 99/005 |
| | | | 706/12 |
| 2013/0103385 A1* | 4/2013 | Ghosh | G06F 17/2785 |
| | | | 704/9 |

FOREIGN PATENT DOCUMENTS

| JP | 2002-92004 A | 3/2002 |
| JP | 2004-78446 A | 3/2004 |

(Continued)

OTHER PUBLICATIONS

International Search Report dated Apr. 9, 2013 for PCT/JP2013/057300 filed on Mar. 14, 2013 with English Translation.

(Continued)

*Primary Examiner* — Amanda L Willis
(74) *Attorney, Agent, or Firm* — Oblon, McClelland, Maier & Neustadt, L.L.P.

(57) ABSTRACT

According to one embodiment, a document analysis apparatus is an apparatus comprising first document storage circuit for storing first documents that include words, belong to respective categories constituting a hierarchical structure, and only comprise opinion documents for a desirable object, and a second document storage circuit for storing second documents that include words, belong or do not belong to the categories constituting the hierarchical structure and comprise opinion documents for the desirable object and documents other than the opinion documents, and the apparatus is configured to classify, into one of the categories constituting the hierarchical structure, the second documents that do not belong to the respective categories among the second documents stored in the second document storage circuit.

2 Claims, 22 Drawing Sheets

(56) References Cited

FOREIGN PATENT DOCUMENTS

| JP | 2005-182611 A | 7/2005 |
|---|---|---|
| JP | 2012-003572 A | 1/2012 |

OTHER PUBLICATIONS

Written Opinion dated Apr. 9, 2013 for PCT/JP2013/057300 filed on Mar. 14, 2013.
Office Action dated Jul., 5. 2016 in Japanese Patent Application No. 2015-505183 (with English language translation).

* cited by examiner

| Item name | Content |
|---|---|
| Document number | d01 |
| Type of product | Product A |
| Body text | Dissatisfaction of "product A is not delicious" from customer |
| Inquiry date | 2011/01/01 |
| Type of inquiry | Dissatisfaction |
| Inquiry large classification | Taste |
| Inquiry middle classification | Bad-tasting |

First document storage unit 101

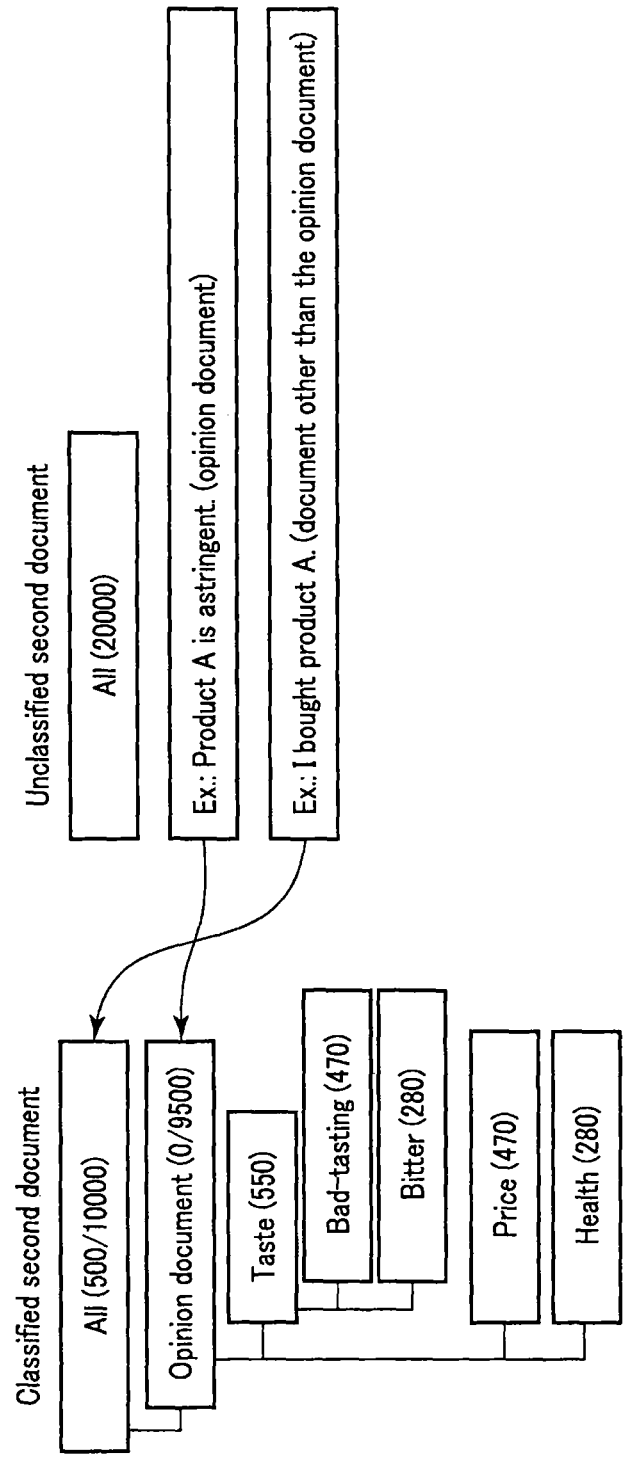
F I G. 13

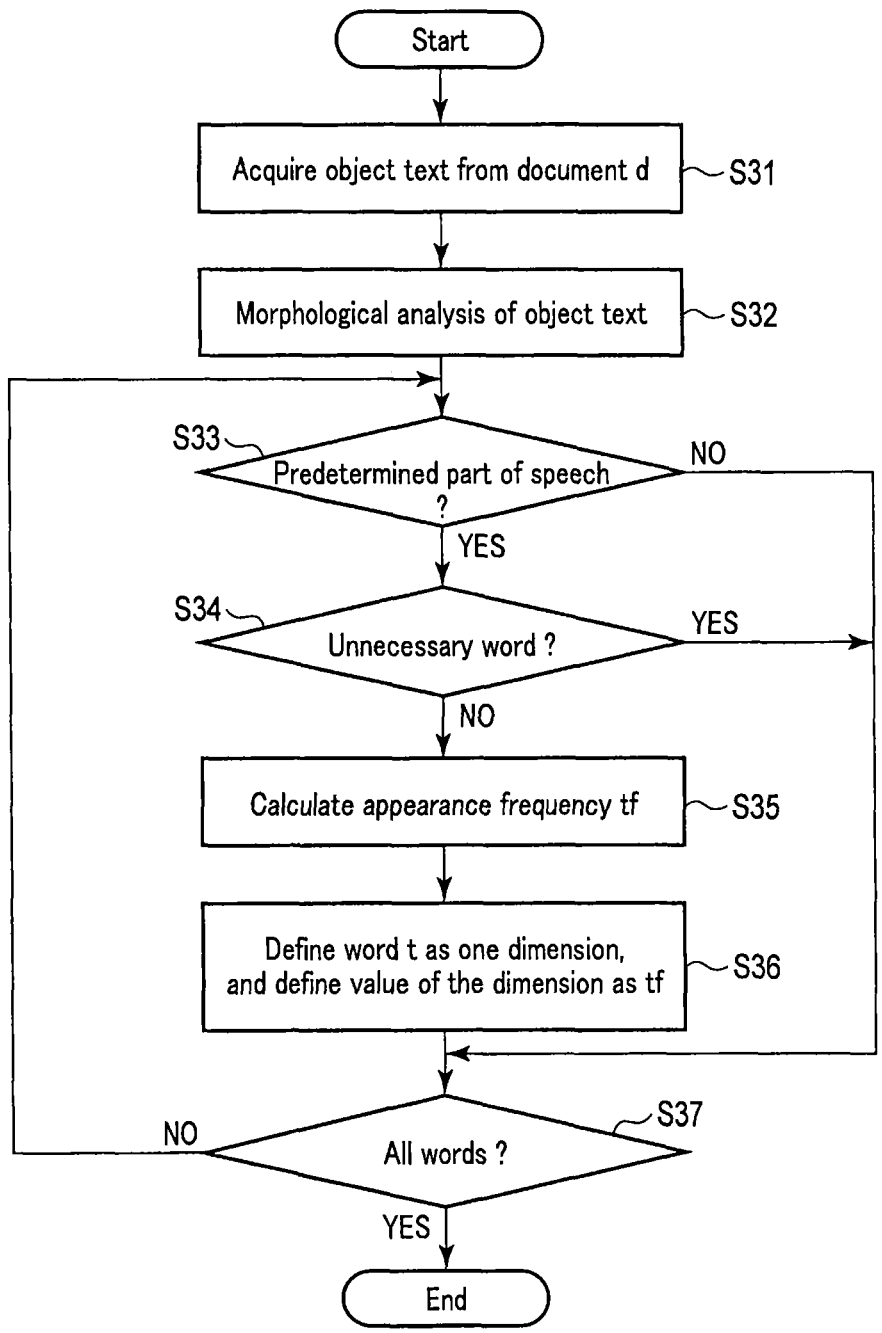
F I G. 15

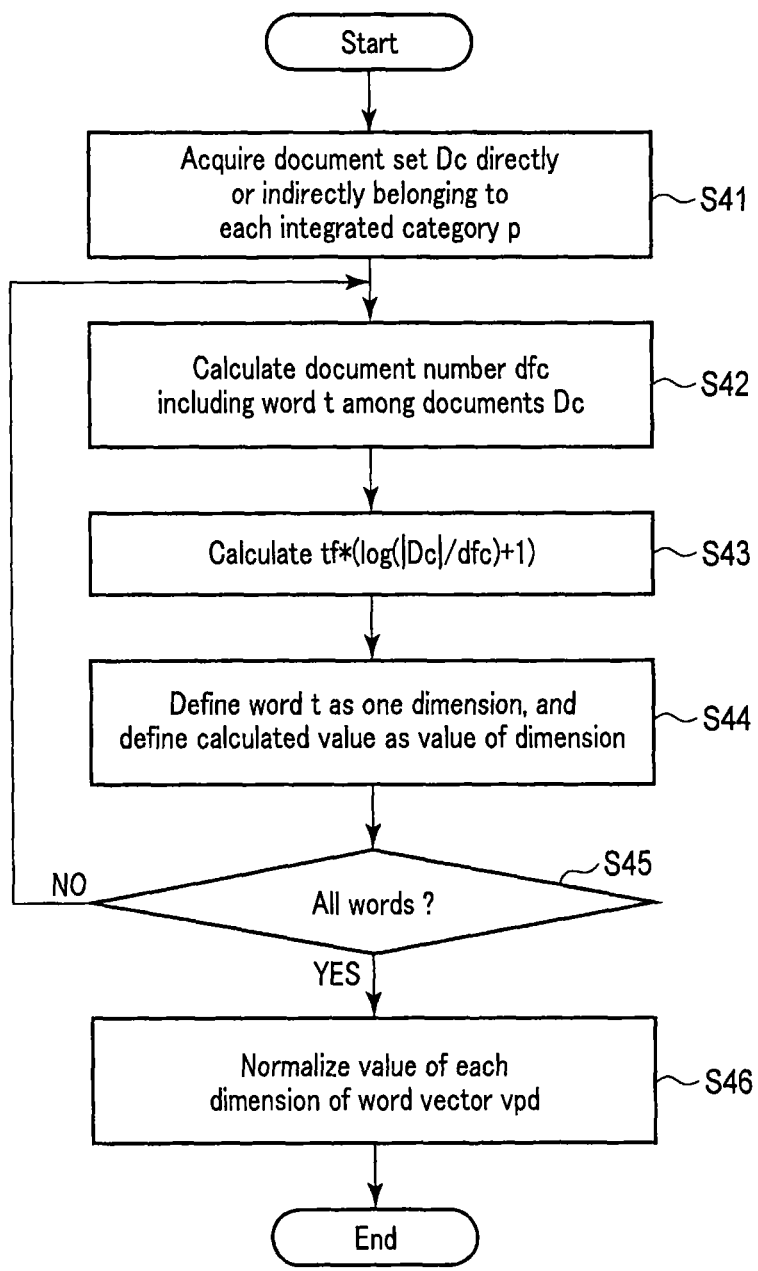
F I G. 16

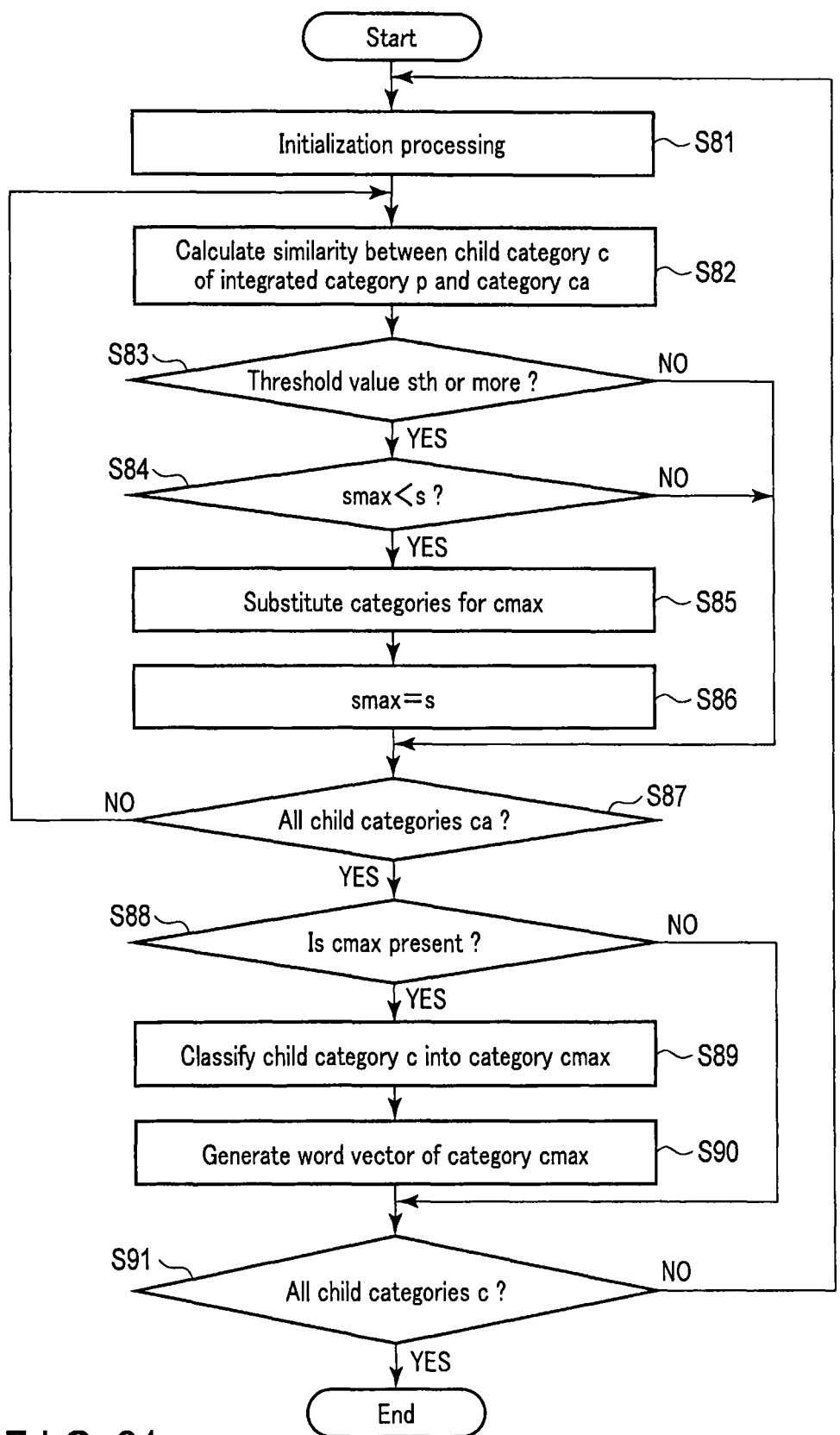
F I G. 21

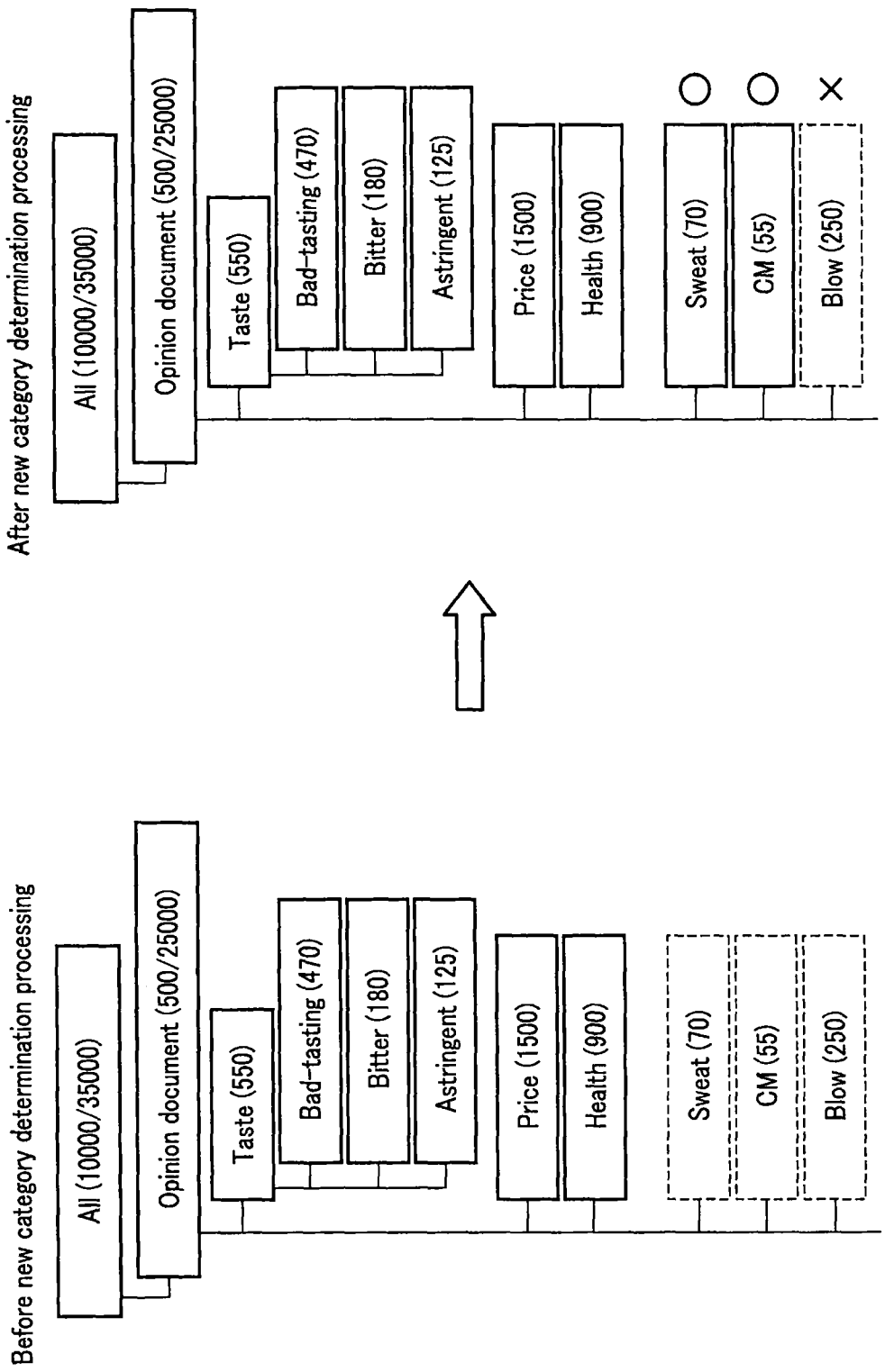
F I G. 24

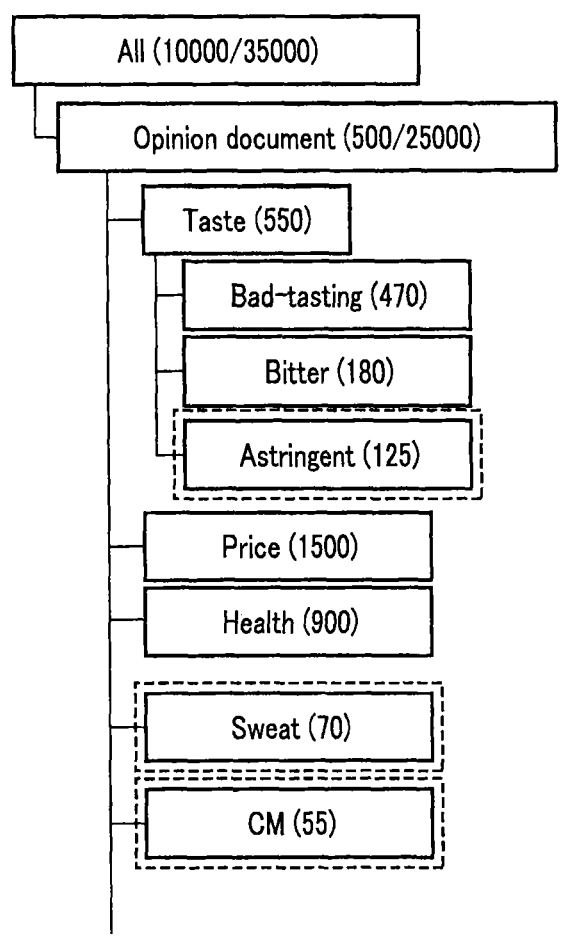
F I G. 25

DOCUMENT ANALYSIS APPARATUS AND DOCUMENT ANALYSIS PROGRAM

CROSS-REFERENCE TO RELATED APPLICATIONS

This is a Continuation application of PCT application No. PCT/JP2013/057300, filed on Mar. 14, 2013, which was published under PCT Article 21(2) in Japanese.

FIELD

Embodiments described herein relate generally to a document analysis apparatus and a document analysis program.

BACKGROUND

In general, as a technique of analyzing opinions of users concerning companies and products, there is a technique of analyzing inquiries sent to a contact center. In this technique, to efficiently analyze users' subjective opinions written in documents (e.g., questionnaires, etc.) collected in the contact center, contents described in the collected documents, i.e., users' remark intentions are classified into demands, questions, dissatisfactions and unexpected views by use of a dictionary, and analyzed from the viewpoints of this classification result and an evaluation axis.

However, the analysis of the inquiries sent to the contact center has the disadvantage that the opinion of the user who does not think that an action of the inquiry is troublesome can only be analyzed.

On the other hand, at present, there is a tendency to increase opportunities for the users to transmit the documents (pieces of information) including free opinions and impressions by use of social media such as a blog, a bulletin board, Twitter™ and Facebook™ This document sometimes includes opinions and impressions to the companies and the products, and it is considered that there is the high possibility that the contents which become subjects in these social media will be sent as the inquiries to the contact center in the future.

Social media, especially social networking services such as Twitter and Facebook, are characterized in that they make it possible for the users to easily transmit the documents and that transmission frequencies and report properties of the documents are high.

Therefore, by collecting the documents of the contents which become the subjects in the social media and analyzing the documents, it is possible to grasp the contents of the documents in advance, i.e., it is possible to previously investigate a method of responding to the inquiries that will be considered to be sent to the contact center in the future. Consequently, in recent years, a technology of appropriately analyzing the documents transmitted to the social media has become important in a call center division in which a call center is installed.

However, documents to be transmitted to social media are often documents in which casual expressions (i.e., unknown contents) are used, and hence, in a conventional technology, there is the disadvantage that the documents cannot appropriately be analyzed and the documents cannot be classified in an appropriate classification system.

A problem to be solved by the invention is to provide a document analysis apparatus which is capable of appropriately analyzing documents and classifying the documents in an appropriate classification system, even when the documents transmitted to social media include documents in which casual expressions are used, and a document analysis program.

BRIEF DESCRIPTION OF THE DRAWINGS

FIG. 3 is a schematic view showing one example of a data structure of a first document to be stored in a first document storage unit according to the embodiment.

FIG. 13 is a schematic view showing one example of processing in which unclassified second documents are classified into opinion documents and documents other than the opinion documents by an opinion document determination unit according to the embodiment.

FIG. 15 is a flowchart showing one example of the operation of the existing category classification unit according to the embodiment.

FIG. 16 is a flowchart showing one example of the operation of the existing category classification unit according to the embodiment.

FIG. 21 is a flowchart showing one example of an operation of a parent category determination unit according to the embodiment.

FIG. 24 is a schematic view showing one example of processing in which the new child category is certified as a new category by the new category determination unit according to the embodiment.

FIG. 25 is a schematic view showing one example of a classification result screen to be displayed in the display.

DETAILED DESCRIPTION

In general, according to one embodiment, a document analysis apparatus is an apparatus comprising a first document storage circuit for storing first documents that include words, belong to respective categories constituting a hierarchical structure, and only comprise opinion documents for a desirable object, and a second document storage circuit for storing second documents that include words, belong or do not belong to the categories constituting the hierarchical structure and comprise opinion documents for the desirable object and documents other than the opinion documents, and the apparatus is configured to classify, into one of the categories constituting the hierarchical structure, the second documents that do not belong to the respective categories among the second documents stored in the second document storage circuit.

The document analysis apparatus comprises a document extraction circuit, an opinion document classification circuit, an existing category classification circuit, a document clustering circuit and a category determination circuit.

The document extraction circuit extracts, from the first document storage circuit and the second document storage circuit, the first document and the second document satisfying conditions in accordance with the conditions on which an input is accepted in response to an operation of a user.

The opinion document classification circuit defines, as training documents, the extracted first documents and the second documents belonging to the respective categories among the extracted second documents, and classifies, into the opinion documents and the documents other than the opinion documents, the second documents that do not belong to the respective categories among the extracted second documents.

The existing category classification circuit defines, as the training documents, the stored first documents and the second documents belonging to the respective categories among the stored second documents, and classifies the classified opinion document into one of the categories to which the training documents belong.

The document clustering circuit defines, as an object, the opinion document that is not classified into any one of the categories by the existing category classification circuit, executes document clustering processing for the object, prepares a new category, and classifies the opinion document into the new category.

The category determination circuit defines, as training documents, the categories to which the stored first documents belong and the categories to which belong the second documents belonging to the respective categories among the stored second documents, and determines whether or not the prepared new category becomes a child category that is subordinate to one of the categories to which the training documents belong.

Hereinafter, embodiments will be described with reference to the drawings.

Figure 1:
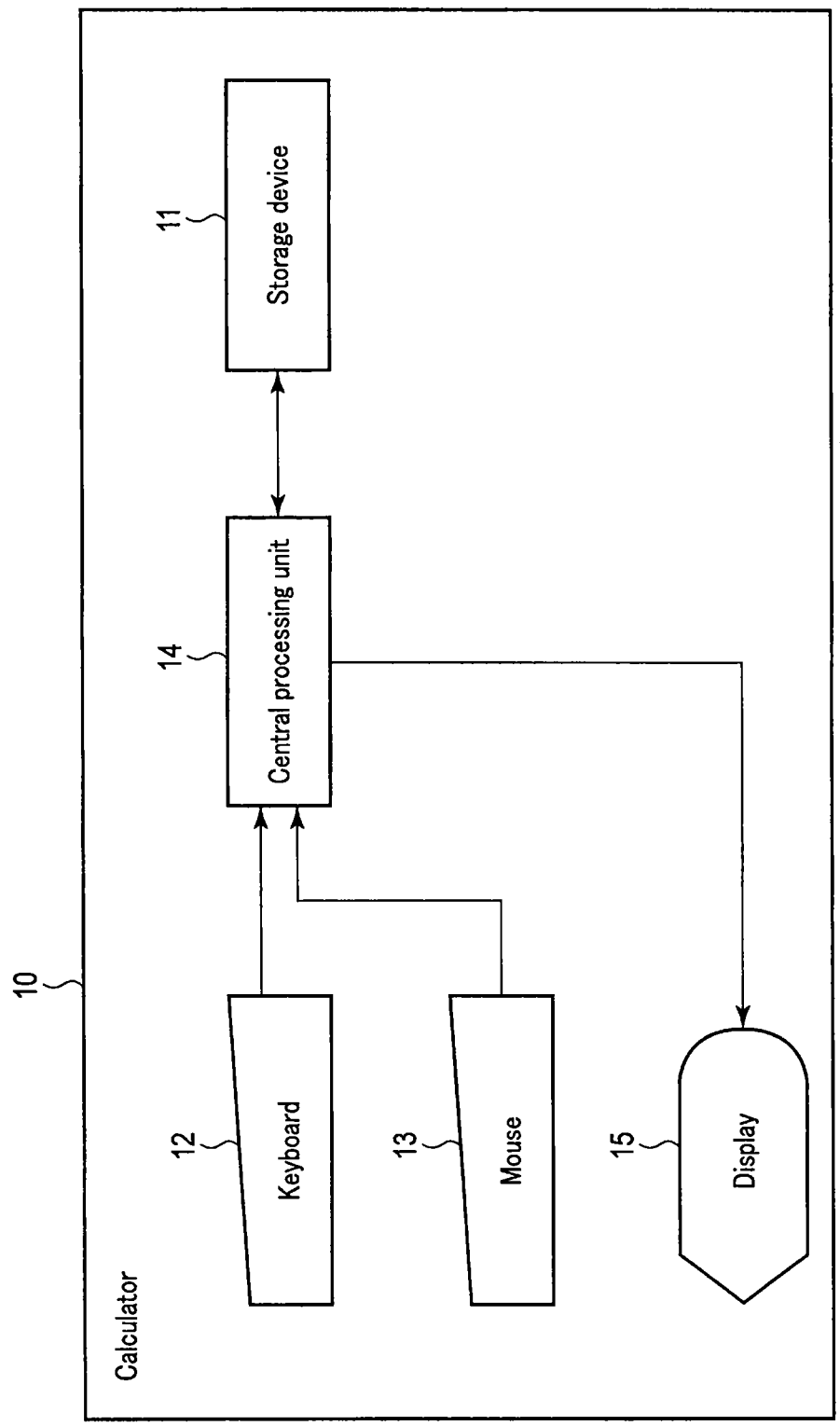
FIG. 1 is a block diagram showing a hardware constitution of a document analysis apparatus according to a present embodiment.

FIG. 1 is a block diagram showing a hardware constitution of a document analysis apparatus according to the present embodiment. It is to be noted that the document analysis apparatus is realized as the hardware constitution to realize each function of the apparatus or a combined constitution of hardware and software. The software comprises a program that is beforehand installed from a storage medium or a network and causes the document analysis apparatus to realize the function.

As shown in FIG. 1, a document analysis apparatus 10 comprises a storage device 11, a keyboard 12, a mouse 13, a central processing unit 14 and a display 15.

The storage device 11 is a storage device that is readable or writable from the central processing unit 14 and is, for example, a RAM (Random Access Memory). In the storage device 11, a program (a document analysis program) to be executed by the central processing unit 14 is beforehand stored.

The keyboard 12 and the mouse 13 are input devices, and input various pieces of information comprising data or commands into the central processing unit 14 by, e.g., an operation of an operator (a user) of the document analysis apparatus 10.

The central processing unit 14 is, for example, a CPU (a processor), and has a function of executing the program stored in the storage device 11, a function of controlling execution of processing on the basis of information to be input from the keyboard 12 or the mouse 13, and a function of outputting the execution result to the display 15.

The display 15 is a display device, and has a function of displaying and visualizing, e.g., each architecture model, each feature model or the like that is being edited. In addition, the display 15 has a function of displaying information output from the central processing unit 14.

It is to be noted that the document analysis apparatus 10 is realized by a calculator to which, e.g., a document analysis program according to the present embodiment is applied.

Figure 2:
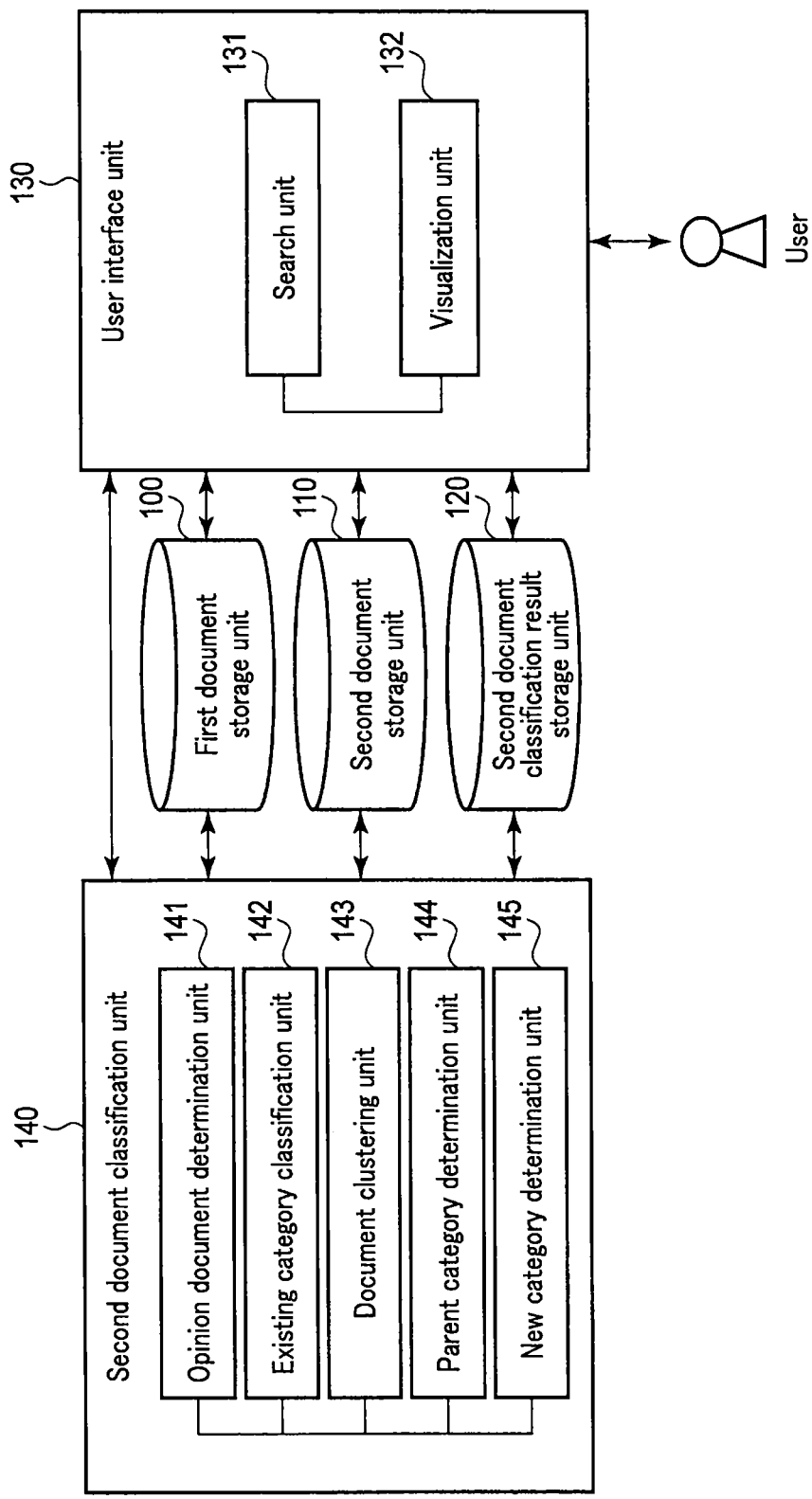
FIG. 2 is a block diagram mainly showing a function constitution of the document analysis apparatus according to the embodiment.

FIG. 2 is a block diagram mainly showing a function constitution of the document analysis apparatus 10 according to the present embodiment.

As shown in FIG. 2, the document analysis apparatus 10 comprises a first document storage unit 100, a second document storage unit 110, a second document classification result storage unit 120, a user interface unit 130 and a second document classification unit 140. It is to be noted that the first document storage unit 100, the second document storage unit 110 and the second document classification result storage unit 120 are stored in, for example, an unshown external storage device or the like. In addition, the user interface unit 130 and the second document classification unit 140 are realized when a computer (the central processing unit 14) of the document analysis apparatus 10 executes the document analysis program stored in the storage device 11.

In the first document storage unit 100, first documents which become objects of the analysis by the document analysis apparatus 10 are stored. The first documents are opinion documents from customers to companies or products, and an example of the document is a document of a call log in which inquiry contents sent to a contact center are described.

In the second document storage unit 110, second documents which become the objects of the analysis by the document analysis apparatus 10 are stored. The second documents are documents contributed to so-called social media such as a blog, a bulletin board, Twitter and Facebook, and differently from the above first documents, the second documents include not only the opinion documents from the customers to the companies and the products but also documents (e.g., a document with content "Today is fine.", etc.) other than the opinion documents. It is to be noted that the second documents stored in the second document storage unit 110 include a second document classified into one of categories indicated by the category information stored in the aforementioned second document classification result storage unit 120 and an unclassified second document. It is to be noted that when "second documents" is mentioned in the following description, this refers to both the classified second document and the unclassified second document.

In the first document storage unit 100 and the second document storage unit 110, the first documents and the second documents are successively stored.

In the second document classification result storage unit 120, there is stored the category information (i.e., the classification results of the second documents) indicating the categories into which the classified second documents stored in the second document storage unit 110 are classified. Specifically, in the second document classification result storage unit 120, there is stored the result indicating that the second documents stored in the second document storage unit 110 are classified on the basis of, e.g., contents of items which the second documents have.

As shown in FIG. 2, the user interface unit 130 further comprises a search unit 131 and a visualization unit 132.

The search unit 131 has a function of searching the first documents of the analysis objects stored in the first document storage unit 100 and the second documents of the analysis objects stored in the second document storage unit 110 in accordance with conditions on which an input is accepted in response to a user's operation, and extracting the first documents and second documents satisfying the conditions from the respective storage units 100 and 110.

The visualization unit 132 has a function of outputting classification results of the first documents and second documents extracted by the search unit 131 (i.e., the categories of the extracted first documents and second documents) to the display 15 shown in FIG. 1 to display (visualize) the results. In consequence, the classification results of the first documents and second documents extracted by the search unit 131 are presented to the user.

As shown in FIG. 2, the second document classification unit 140 further comprises an opinion document determination unit 141, an existing category classification unit 142, a document clustering unit 143, a parent category determination unit 144 and a new category determination unit 145.

The opinion document determination unit 141 has a function of classifying unclassified second documents among the second documents extracted by the search unit 131 into the opinion documents and documents other than the opinion documents.

The existing category classification unit 142 has a function of defining, as training documents, the first documents stored in the first document storage unit 100 and the classified second documents among the second documents stored in the second document storage unit 110, and classifying the opinion documents classified by the opinion document determination unit 141 into one of the categories to which the training documents belong.

The document clustering unit 143 has a function of defining, as an object, the opinion document that is not classified into any one of the categories by the existing category classification unit 142, executing document clustering processing for the object, preparing a new category and classifying the opinion document into the new category.

The parent category determination unit 144 has a function of defining, as the training documents, the categories to which the first documents stored in the first document storage unit 100 belong and the categories to which the classified second documents stored in the second document storage unit 110 belong, and determining whether or not the new category prepared by the document clustering unit 143 becomes a child category that is subordinate to one of the categories to which the training documents belong.

The new category determination unit 145 has a function of adding the new category prepared by the document clustering unit 143 as a renewed category to a classification system comprising the categories to which the first documents stored in the first document storage unit 100 belong and the categories to which the classified second documents stored in the first document storage unit 100 belong.

FIG. 3 is a schematic view showing one example of a data structure of the first document stored in the first document storage unit 100 shown in FIG. 2. In the example shown in FIG. 3, in the first document, as item names of items which the first document has, there are included document number to identify the first document, a type of product which is an object of inquiry concerning the first document, a body text that is content of the first document, an inquiry date, an inquiry type indicating intention of the customer concerning the content of the first document, an inquiry large classification indicating an opinion of the customer concerning the content of the first document, and an inquiry middle classification indicating, in more detail, the opinion of the customer indicated by the inquiry large classification.

Additionally, in the first document, for example, content "d01" is included in association with the item name "document number". This indicates that the document number to identify the first document is "d01". Here, (the content associated with) the item name "document number" has been described, but in the first document, the contents are similarly included in association with the item names also concerning the other items. It is to be noted that in the content included in the first document in association with the item name "body text", a text comprising words is included and, for example, the opinion from the customer and the intention of the customer are included.

Here, the first document has been described, but in the first document storage unit 100, the first documents are stored. In addition, the first document stored in the first document storage unit 100 does not have to have all of the abovementioned items which the first document shown in FIG. 3 has, and may have another item.

Figure 4:
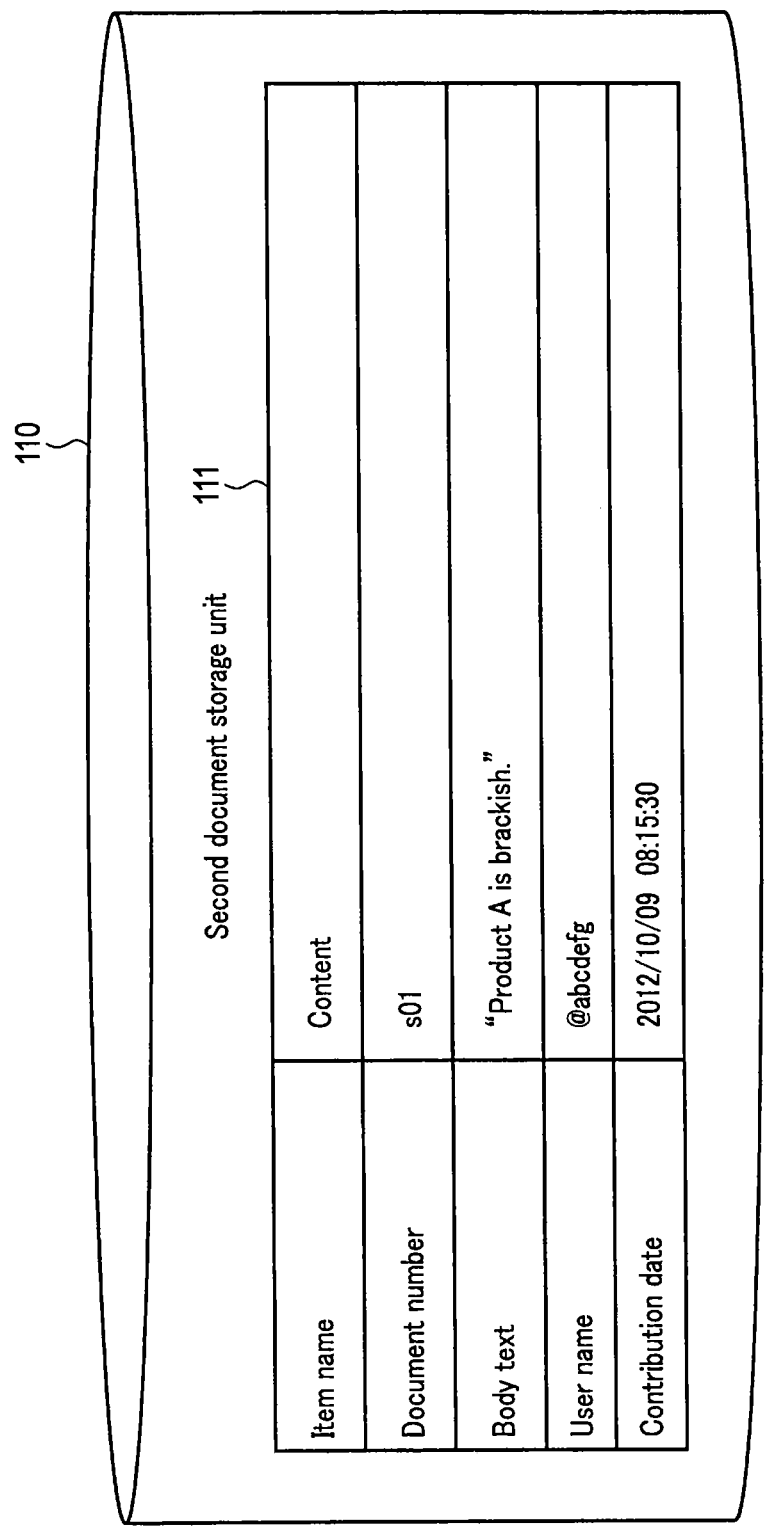
FIG. 4 is a schematic view showing one example of a data structure of a second document to be stored in a second document storage unit according to the embodiment.

FIG. 4 is a schematic view showing one example of a data structure of the second document stored in the second document storage unit 110 shown in FIG. 2. In the example shown in FIG. 4, in a second document 111, as item names of items which the second document 111 has, there are included a document number to identify the second document 111, a body text that is the content of the second document 111, a user name of a user who utilizes the social media to which the second document 111 was contributed, and a contribution date when the second document 111 was contributed.

Additionally, in the second document 111, for example, content "s01" is included in association with the item name "document number". This indicates that the document number to identify the second document 111 is "s01". Here, (the content associated with) the item name "document number" has been described, but in the second document 111, contents are similarly included in association with the item names also concerning the other items. It is to be noted that, in the content included in the second document 111 in association with the item name "body text", a text comprising words is included. In the case of the second document 111 shown in FIG. 4, in the content of the item whose item name is "the body text", user's opinion such as "Product A is brackish." or the like to the product is included.

Here, the second document 111, which has been described above, is stored in the second document storage unit 110. Additionally, the second document stored in the second document storage unit 110 does not have to have all of the abovementioned items which the second document 111 shown in FIG. 4 has, and may have another item.

Each of FIG. 5 to FIG. 10 is a schematic view showing one example of a data structure of the category information stored in the second document classification result storage unit 120 shown in FIG. 2. The category information stored in the second document classification result storage unit 120 indicates categories into which the second documents stored in the second document storage unit 110 are classified (i.e., the categories of the classified second documents). It is to be noted that the categories indicated by the category information stored in the second document classification result storage unit 120 constitute, for example, a hierarchical structure. It is to be noted that, in the present embodiment, there are beforehand prepared the categories into which the second documents stored in the second document storage unit 110 are classified, and the category information indicating the categories is stored in the second document classification result storage unit 120. In addition, the categories may be prepared by, for example, clustering the second documents stored in the second document storage unit 110.

Figure 6:
FIG. 6 is a schematic view showing one example of the data structure of the category information to be stored in the second document classification result storage unit according to the embodiment.
Figure 7:
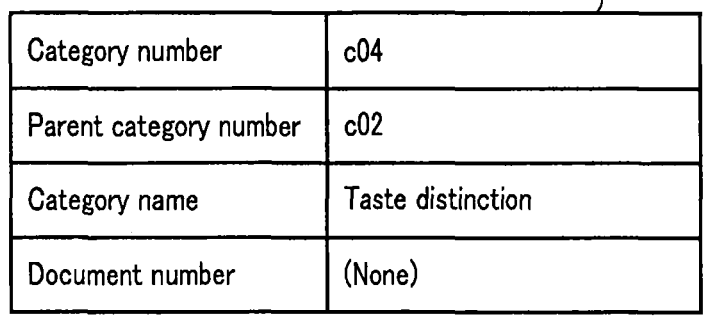
FIG. 7 is a schematic view showing one example of the data structure of the category information to be stored in the second document classification result storage unit according to the embodiment.
Figure 8:
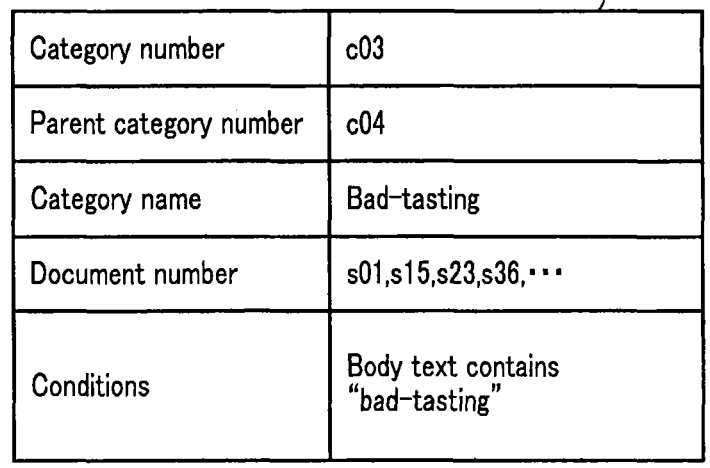
FIG. 8 is a schematic view showing one example of the data structure of the category information to be stored in the second document classification result storage unit according to the embodiment.

As shown in FIG. 5 to FIG. 10, the category information includes category numbers, parent category numbers, category names and the document numbers. It is to be noted that, as shown in FIG. 8, conditions may be included in the category information as needed.

The category number is an identifier to uniquely identify the category. The parent category number indicates the category number to identify a category (a parent category) positioned as a category that is one class higher than the category identified by the category number in the hierarchical structure. The category name indicates a name of the category identified by the category number. The document number indicates a document number to identify the second document classified into the category identified by the category number. In addition, the condition indicates a condition to be satisfied by the document classified into the category identified by the category number.

Figure 5:
FIG. 5 is a schematic view showing one example of a data structure of category information to be stored in a second document classification result storage unit according to the embodiment.

In the example shown in FIG. 5, category information 121 includes a category number "c01", a parent category number "(none)", a category name "(route)" and document numbers "s10, s11, s12, . . . ". According to the category information 121, it is indicated that the category name of the category identified by the category number "c01" is "(route)", i.e., the category is a category (hereinafter, written as a route category) of a route in the hierarchical structure of the categories. It is to be noted that the parent category number "(none)" indicates that the parent category of the category (the route category) identified by the category number "c01" in the hierarchical structure is not present. Additionally, it is indicated that, into the route category identified by the category number "c01", the second documents identified by the document numbers "s10", "s11", "s12" and the like are classified.

In the example shown in FIG. 6, category information 122 includes a category number "c02", a parent category number "c01", a category name "opinion document" and a document number "(none)". According to the category information 122, it is indicated that the parent category of the category identified by the category number "c02" is a category identified by the parent category number "c01" (i.e., the category indicated by the category information 121 shown in FIG. 5). In addition, it is indicated that the category name of the category identified by the category number "c02" is "the opinion document". Furthermore, the document number "(none)" indicates that no documents are classified into the category identified by the category number "c02". It is to be noted that this also applies to the document number "(none)" included in the category information described below, and hence, the description is omitted.

In the example shown in FIG. 7, category information 123 includes a category number "c04", a parent category number "c02", a category name "taste distinction" and the document number "(none)". According to the category information 123, it is indicated that the parent category of the category identified by the category number "c04" is a category identified by the parent category number "c02" (i.e., the category indicated by the category information 122 shown in FIG. 6). In addition, it is indicated that the category name of the category identified by the category number "c04" is "the taste distinction".

In the example shown in FIG. 8, category information 124 includes a category number "c03", a parent category number "c04", a category name "bad-tasting", document numbers "s01, s15, s23, s36, . . . " and a condition 'the body text contains "bad-tasting"'. According to the category information 124, it is indicated that a parent category of the category identified by the category number "c03" is a category identified by the parent category number "c04" (i.e., the category indicated by the category information 123 shown in FIG. 7). In addition, it is indicated that the category name of the category identified by the category number "c03" is "bad-tasting". Furthermore, it is indicated that, into the category identified by the category number "c03", the second documents satisfying the condition 'the body text contains "bad-tasting"', i.e., the second documents identified by the document numbers "s01", "s15", "s23", "s36" and the like are classified. It is to be noted that the condition 'the body text contains "bad-tasting"' indicates that the second document includes "bad-tasting" as the content of the item name "body text".

Figure 9:
FIG. 9 is a schematic view showing one example of the data structure of the category information to be stored in the second document classification result storage unit according to the embodiment.

In the example shown in FIG. 9, category information 125 includes a category number "c31", the parent category number "c01", a category name "price distinction" and document numbers "s07, s23, s58, . . . ". According to the category information 125, it is indicated that the parent category of the category identified by the category number "c31" is the category identified by the parent category number "c01" (i.e., the category indicated by the category information 121 shown in FIG. 5). In addition, it is indicated that the category name of the category identified by the category number "c31" is "the price distinction". Furthermore, it is indicated that, into the category identified by the category number "c31", the second documents identified by the document numbers "s07", "s23", "s58" and the like are classified.

Figure 10:
FIG. 10 is a schematic view showing one example of the data structure of the category information to be stored in the second document classification result storage unit according to the embodiment.

In the example shown in FIG. 10, category information 126 includes a category number "c32", the parent category number "c01", a category name "health distinction" and document numbers "s15, s32, s69, . . . ". According to the category information 126, it is indicated that the parent category of the category identified by the category number "c32" is the category identified by the category number "c01" (i.e., the category indicated by the category information 121 shown in FIG. 5). In addition, it is indicated that the category name of the category identified by the category number "c32" is "the health distinction". Furthermore, it is indicated that, into the category identified by the category number "c32", the second documents identified by the document numbers "s15", "s32", "s69" and the like are classified.

Figure 11:
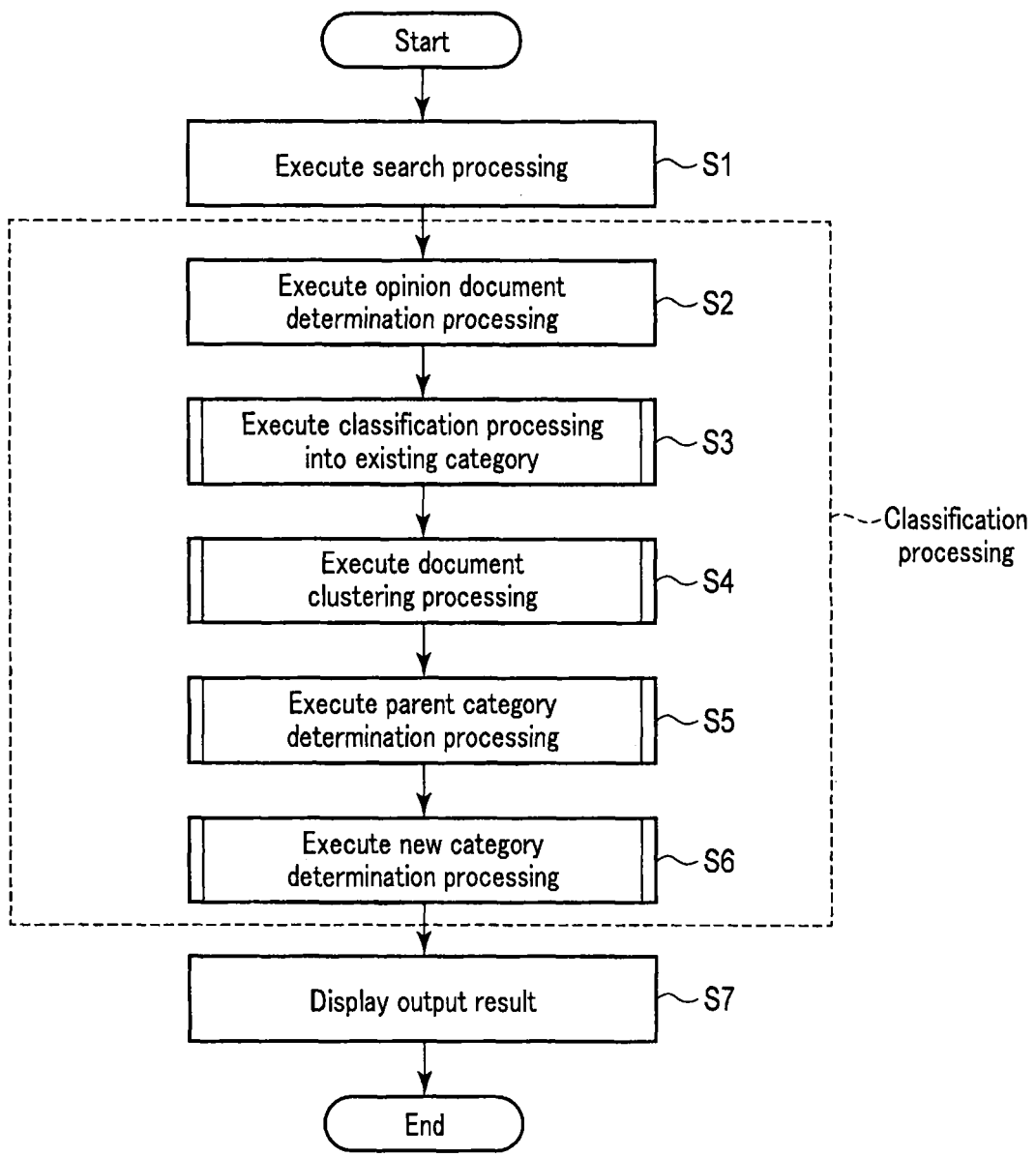
FIG. 11 is a flowchart showing one example of an operation of the document analysis apparatus of the embodiment.

Next, one example of an operation of the document analysis apparatus 10 having the abovementioned constitution will be described with reference to a flowchart of FIG. 11.

First, the search unit 131 of the user interface unit 130 accepts, in response to the user's operation, an input of a search keyword (a search condition), an input to designate an object (an item name) of search processing to be executed to the unclassified second documents stored in the second document storage unit 110, an input to designate search conditions of the search processing to be executed to the classified second documents stored in the second document storage unit 110 and an input to designate an object (an item name) of the search processing to be executed to the first documents stored in the first document storage unit 100, and then, the search unit 131 executes the search processing in accordance with the search conditions on which the inputs have been accepted, and extracts the first documents satisfying the search conditions, the unclassified second documents and the classified second documents from the first document storage unit 100 and the second document storage unit 110 (step S1).

Figure 12:
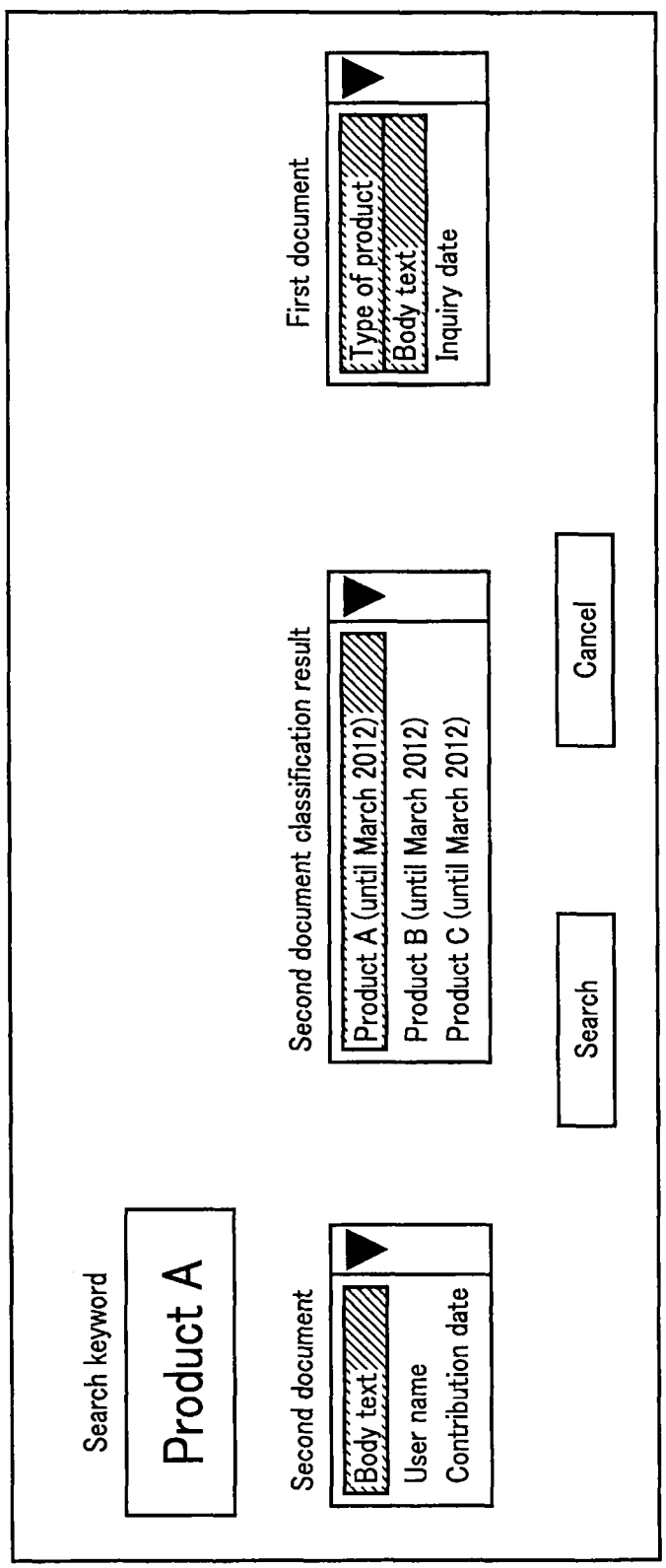
FIG. 12 is a schematic view showing one example of a search screen to be displayed in a display.

Here, FIG. 12 is a schematic view showing one example of a search screen to be displayed in, for example, the display 15 during the abovementioned processing of the step S1. In the search screen shown in FIG. 12, there are disposed a keyword input region, a first search object designation region, a search condition designation region, a second search object designation region, a search button and a cancel button. In the example shown in FIG. 12, a search keyword "product A" is input into the keyword input region, an item name "body text" is designated as a search object in the first search object designation region, search conditions "product A (March 2012)" are designated in the search condition designation region, and item names "type of product" and "body text" are designated as the search objects in the second search object designation region.

Therefore, the search unit 131 extracts, from the second document storage unit 110, the unclassified second documents including a word called the search keyword "product A" in the contents associated with the item name "body text" among the unclassified second documents stored in the second document storage unit 110. Additionally, the search unit 131 extracts, from the second document storage unit 110, the classified second documents classified into one of the categories indicated by the category information stored in the second document classification result storage unit 120 concerning "the product A" by "March 2012" among the classified second documents stored in the second document storage unit 110. In addition, the search unit 131 extracts, from the first document storage unit 100, the first documents including the word called the search keyword "product A" in contents associated with the item name "type of product" among the first documents stored in the first document storage unit 100. Furthermore, the search unit 131 extracts, from the first document storage unit 100, the first documents including the word called the search keyword "product A" in the contents associated with the item name "body text" among the first documents stored in the first document storage unit 100.

It is to be noted that results of extraction processing by the search unit 131 are appropriately presented to the user by the visualization unit 132.

Again returning to FIG. 11, the opinion document determination unit 141 of the second document classification unit 140 classifies the extracted unclassified second documents into the opinion documents and the documents other than the opinion documents, by use of the unclassified second documents and classified second documents extracted by the search unit 131 (step S2).

Here, FIG. 13 is a schematic view showing one example of processing in which the unclassified second documents are classified into the opinion documents and the documents other than the opinion documents by the opinion document determination unit 141. In the example shown in FIG. 13, the unclassified second documents are classified into the opinion documents and the documents other than the opinion documents by use of the unclassified second documents and the classified second documents. Specifically, the example is shown in which the document, other than the opinion document, which says "I bought product A" is classified into the route category indicated by the category information 121 stored in the second document classification result storage unit 120, and the opinion document saying "product A is astringent" is classified into the category of the category name "opinion document" indicated by the category information 122 stored in the second document classification result storage unit 120.

It is to be noted that, in the classification into the opinion document and the document other than the opinion document, a known technology using SVM mechanical learning or the like is used. For example, the words included in the opinion documents and the words included in the documents other than the opinion documents are learned as features by the SVM, thereby preparing a classification model that enables the classification into the opinion documents and the documents other than the opinion documents. When this classification model is used, it is possible to classify the successively stored unclassified second documents, i.e., the newly collected second documents into the opinion documents and the documents other than the opinion documents by use of the words included in the second documents as the features. The technology is known, and is therefore not described in detail any more here.

Again returning to FIG. 11, the existing category classification unit 142 of the second document classification unit 140 defines, as the training documents, the first documents stored in the first document storage unit 100 and the classified second documents stored in the second document storage unit 110, and classifies the opinion document classified by the opinion document determination unit 141 into one of the existing categories (step S3). Here, the existing categories include a category (hereinafter, written as a category cc) indicated by the content associated with the item names "inquiry large classification" and "inquiry middle classification" of the first documents stored in the first document storage unit 100, and a category (hereinafter, written as a category sc) indicated by the category name included in the category information stored in the second document classification result storage unit 120.

Figure 14:
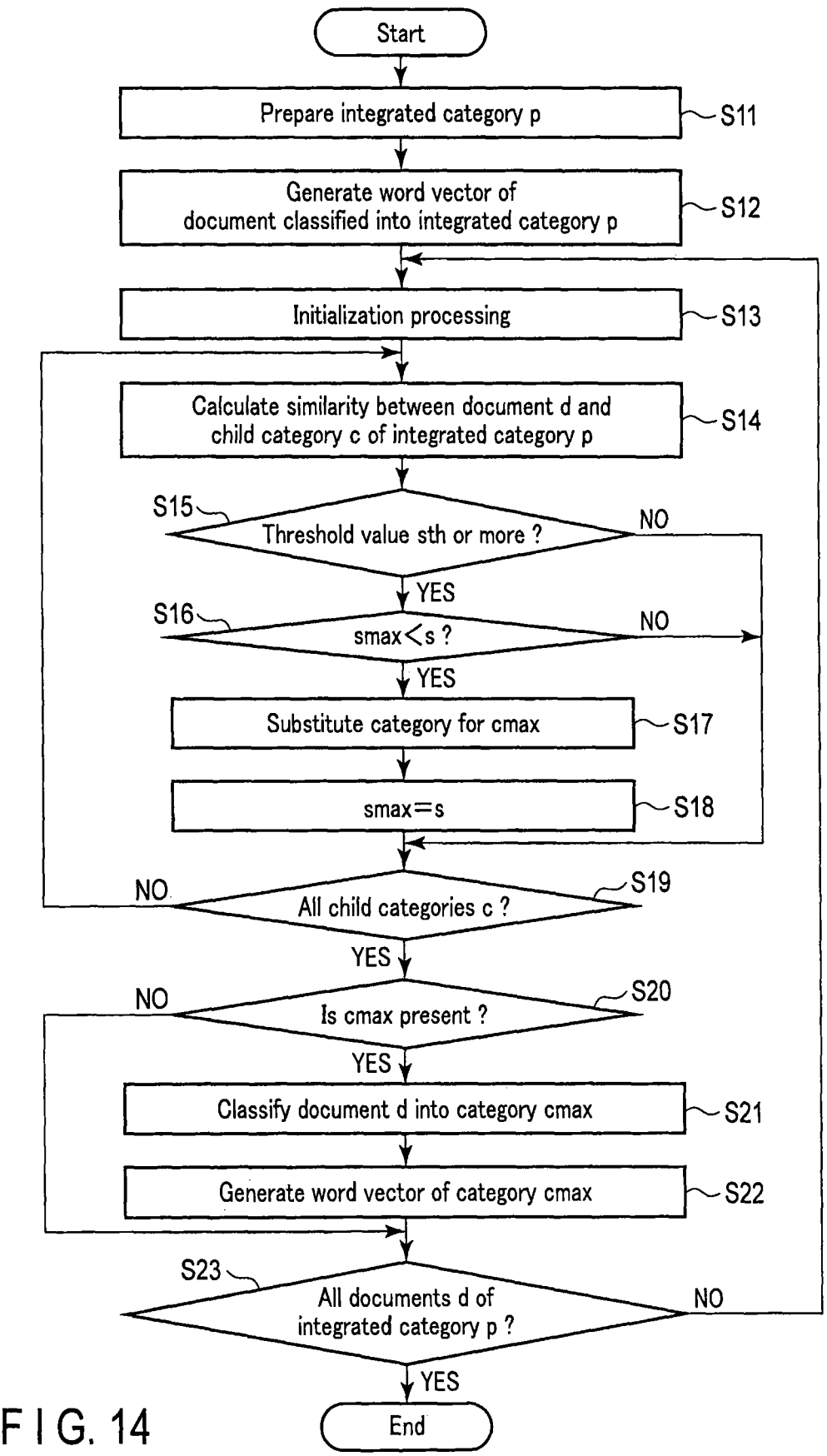
FIG. 14 is a flowchart showing one example of an operation of an existing category classification unit according to the embodiment.

Here, details of the abovementioned processing of the step S3 by the existing category classification unit 142 are described with reference to a flowchart of FIG. 14.

First, the existing category classification unit 142 associates the category cc and the category sc to prepare a category in which these categories are integrated (hereinafter, written as an integrated category p) (step S11).

Specifically, the existing category classification unit 142 prepares the integrated category p, when the category (the category cc) indicated by the content associated with the item names "inquiry large classification" and "inquiry middle classification" of the first document matches the category (the category sc) indicated by the category name included in the category information. When the integrated category p is prepared in this manner, the document obtained by combining the first document classified into the category cc and the second document classified into the category sc is classified into the integrated category p.

It is to be noted that, here, when the category cc matches the category sc as described above, the first document is associated with the second document, but characteristic words of the category cc and the category sc may be extracted and the first document may be associated with the second document, when the characteristic words are matched.

Subsequently, the existing category classification unit 142 generates a word vector of the document classified into the integrated category p (step S12).

Figure 17:
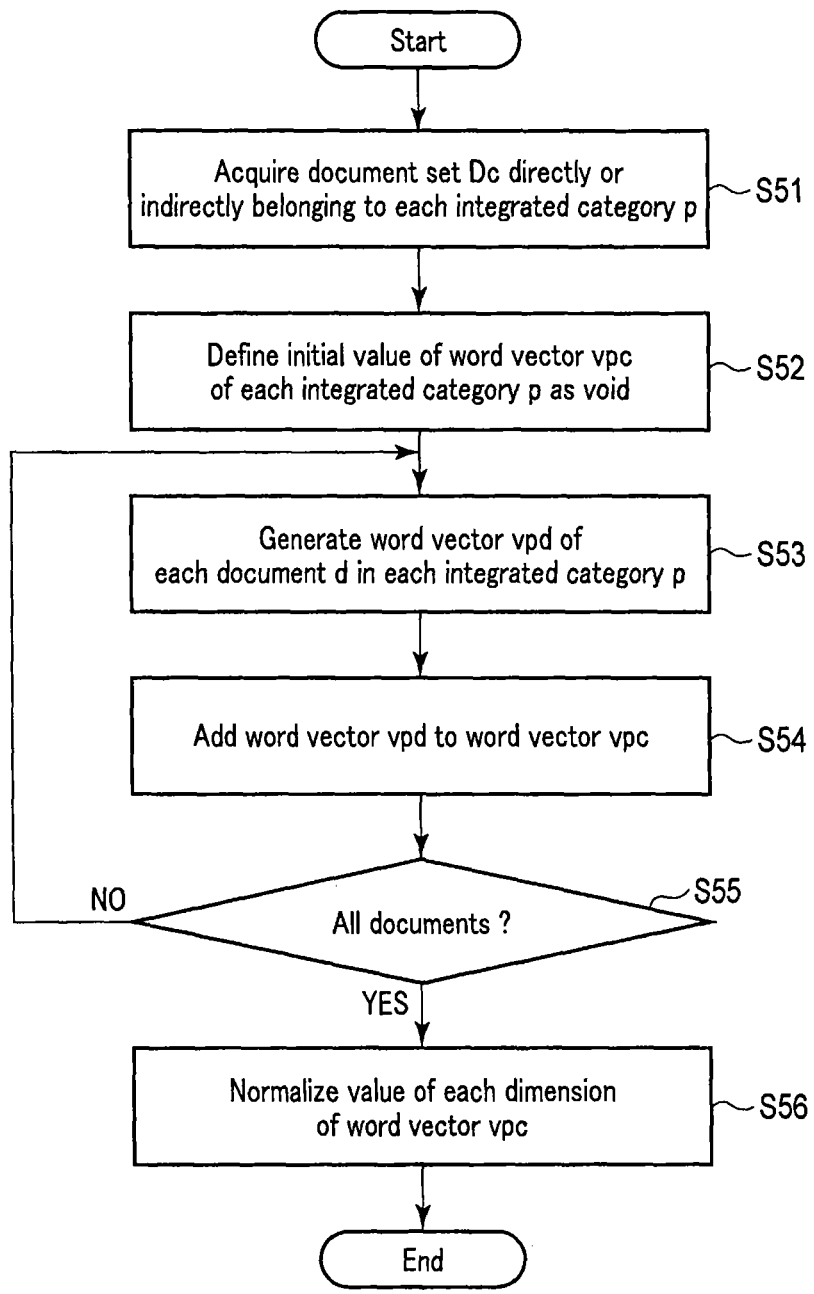
FIG. 17 is a flowchart showing one example of the operation of the existing category classification unit according to the embodiment.

Here, details of the abovementioned processing of the step S12 by the existing category classification unit 142 are described with reference to flowcharts of FIG. 15 to FIG. 17. Here, processing of generating the word vector of the document of the existing category and the word vector of the document of a classification object is required, but the processing can collectively be executed, and hence, a procedure of the processing will be described.

It is to be noted that the first document and second document which become objects of processing shown in FIG. 15 and are classified into the category p and the training document of the existing category are all defined as the documents d. In addition, the document d indicates each opinion document classified by the opinion document determination unit 141, and the word vector of the document d is defined as a word vector vpd. Each document classified by the opinion document determination unit 141 belongs to the category having the hierarchical structure as shown in FIG. 13.

First, the existing category classification unit 142 acquires a text that becomes an object to generate the word vector vpd from the document d (hereinafter, written as an object text) (step S31). Here, a body text included in the document d is acquired as the object text, but when a text comprising words is included in the document d in addition to the body text, the text may be acquired as the object text.

Subsequently, the existing category classification unit 142 performs morphological analysis of the acquired object text (step S32). The existing category classification unit 142 acquires the words included in the acquired object text and a part of speech of each word on the basis of the morphological analysis result.

The existing category classification unit 142 executes the following processing of step S33 to step S36 concerning each of the acquired words. Hereinafter, the word that becomes an object of this processing is defined as a word t.

Next, the existing category classification unit 142 determines whether or not the part of speech of the word t corresponds to a predetermined part of speech (step S33). Here, examples of the predetermined part of speech include a noun, a Sahen noun and a proper noun. That is, for example, a conjunction, an adverb or the like is not included in the predetermined part of speech.

When it is determined that the part of speech of the word t is the predetermined part of speech (YES of the step S33), the existing category classification unit 142 determines whether or not the word t corresponds to a predetermined unnecessary word (step S34). Here, the unnecessary word is a word that does not express characteristics of the document. For example, when a patent document, which is different from the document d according to the present embodiment, is defined as the document d, a word such as "device" or "means" does not express the characteristics of the document, and hence, the word is beforehand set as the unnecessary word.

When it is determined that the word t does not correspond to the predetermined unnecessary word (NO of the step S34), the existing category classification unit 142 calculates a frequency at which the word t appears in the acquired object text (hereinafter, written as an appearance frequency tf) (step S35).

Subsequently, the existing category classification unit 142 defines the word t as one dimension in the word vector vpd, and defines the calculated appearance frequency tf as a value of the dimension (step S36).

Next, it is determined whether or not the processing of the step S33 to the step S36 has been executed concerning all the words (the words included in the object text) that can be obtained by the abovementioned morphological analysis (step S37).

When it is determined that the processing is not executed concerning all the words that can be obtained by the morphological analysis (NO of the step S37), the processing returns to the step S33 to be repeated. In this case, the word in which the processing of the step S33 to the step S36 is not executed is defined as the word t, and then processing advances.

On the other hand, when it is determined that the processing has been executed concerning all the words obtained by the morphological analysis (YES of the step S37), processing ends.

As described above, the processing of the step S33 to the step S36 has been executed concerning all the words obtained by the morphological analysis, thereby generating the word vector vpd in which the word that is the predetermined part of speech and is not the unnecessary word is defined as the dimension.

For example, in the abovementioned body text of the first document shown in FIG. 3, a word such as "the taste" appears once, i.e., the appearance frequency of the "taste" is 1. Therefore, in the word vector of the first document shown in FIG. 3, the value of "the taste" that is one dimension of the word vector (the value of the dimension) is 1. This also applies to the other dimensions (e.g., "A", "not delicious", etc.).

On the other hand, when it is determined in the abovementioned step S33 that the part of speech of the word t is not the predetermined part of speech and when it is determined in the step S34 that the word t corresponds to the predetermined unnecessary word, the processing of the step S37 is executed.

Next, processing of generating the word vector vpd for use during the abovementioned processing of the step S14 by the existing category classification unit 142 will be described with reference to FIG. 16. First, the existing category classification unit 142 acquires a document set directly or indirectly belonging to the integrated category p (hereinafter, written as a document set Dc) (step S41). Here, the document set Dc directly or indirectly belonging to the integrated category p means a set of the documents belonging to the integrated category p as described above and documents belonging to the category positioned at a class lower than the class of the child category (the child category of the integrated category p, i.e., the child category of the integrated category p or the like). It is to be noted that the category positioned at the class lower than the class of the integrated category p includes all the categories positioned at the class lower than the class of the integrated category p, e.g., the child category of the child category of the integrated category p (i.e., a grandchild category of the integrated category p).

Subsequently, the existing category classification unit 142 executes the following processing of step S42 to step S44 concerning each of the words defined as the respective dimensions of the word vector vpd of the document d generated by the abovementioned processing shown in FIG. 15.

The existing category classification unit 142 calculates the number of the documents including the word t (hereinafter, written as a document number dfc) for (the documents included in) the acquired document set Dc (step S42).

Next, the existing category classification unit 142 calculates a value of a calculation formula "tf*(log(|Dc|/dfc)+1)" by use of the calculated document number dfc (step S43). Here, |Dc| is the number of the documents of the document set Dc and "*" indicates multiplication (×). In addition, tf is a value of the dimension of the word t in the word vector vpd of the document d generated by the abovementioned processing shown in FIG. 15 (i.e., the appearance frequency in the object text of the word t which is calculated in the step S35 shown in FIG. 15).

This calculation formula is called TF*IDF, and is broadly used in, for example, a field of information search or document classification. According to this TF*IDF, the larger the frequency at which the word t appears in the document d is (i.e., the larger the value of tf is), or the fewer the documents including the word t among the documents indirectly or directly belonging to the integrated category p there are (i.e., the smaller the value of dfc is), the larger the value of TF*IDF becomes, and it is considered that the word t is a word that appropriately expresses the characteristics of the document d.

Subsequently, the existing category classification unit 142 defines the word t as one dimension of the word vector vpd (the word vector of the document d in the integrated category p), and defines the value calculated in the step S43 (the value of TF*IDF) as the value of the dimension (step S44).

Next, it is determined whether or not the abovementioned processing of the step S42 to the step S44 has been executed concerning all the words defined as the respective dimensions of the word vector vpd generated by the abovementioned processing shown in FIG. 15 (step S45).

When it is determined that the processing is not executed concerning all the words defined as the respective dimensions of the word vector vpd (NO of the step S45), the processing returns to the step S42 to be repeated. In this case, the word for which the processing of the step S42 to the step S44 is not executed is defined as the word t, and then processing advances.

On the other hand, when it is determined that the processing has been executed concerning all the words defined as the respective dimensions of the word vector vpd (YES of the step S45), the word vector vpd is generated in which the respective words defined as the respective dimensions of the word vector vpd are defined as the dimensions.

When the word vector vpd generated in this manner is compared with the word vector vpd generated by the abovementioned processing shown in FIG. 15, the vector has a large value (weight of the word) of the dimension that appropriately expresses the characteristics of the document d in the integrated category p.

It is to be noted that, in a portion corresponding to IDF in the abovementioned TF*IDF, i.e., a portion of (log(|Dc|/dfc)+1), the document set Dc directly or indirectly belonging to the integrated category p is defined as the object. In consequence, for example, when the number of the documents of the document set Dc is small, the weight of the word t which is not originally characteristic (the value of TF*IDF) becomes larger in a certain case. Therefore, the portion of IDF in TF*IDF may be calculated by using, for example, all the document sets (document sets D) stored in the first document storage unit 100 and the second document storage unit 110 and the number (df) of the documents including the word t in the document set D. In addition, there may be used a value (e.g., an average) in which both the value of the portion of IDF calculated by using the document set Dc (and the document number dfc) and the value calculated by using the document set D (and the document number df) are taken into consideration.

Furthermore, in the processing of calculating the document number dfc including the word t in the step S42, an efficiency of the processing may improve by using means such as an inverted file in the information search.

Afterward, the existing category classification unit 142 divides the value of each dimension of the generated word vector vpd by a norm |vpd| of the word vector vpd to normalize the value (step S46). As a result, the word vector vpd becomes a vector whose norm is 1.

Next, there will be described a processing procedure of the existing category classification unit 142 when a word vector vpc is generated, with reference to FIG. 17.

First, the existing category classification unit 142 acquires the document set Dc directly or indirectly belonging to the integrated category p (step S51).

Subsequently, the existing category classification unit 142 defines an initial value of the word vector vpc as a void (i.e., defines all dimension values as 0) (step S52).

Next, the existing category classification unit 142 executes the following processing of step S53 and step S54 concerning each of the documents included in the acquired document set Dc.

The existing category classification unit 142 generates the word vector vpd of the document d in the integrated category p (step S53). The word vector vpd is generated by the abovementioned processing shown in FIG. 16.

Subsequently, the existing category classification unit 142 adds (the value of each dimension of) the generated word vector vpd to the word vector vpc (step S54).

Next, it is determined whether or not the abovementioned processing of the step S53 and the step S54 has been executed concerning all the documents included in the document set Dc (step S55).

When it is determined that the processing is not executed concerning all the documents included in the document set Dc (NO of the step S55), the processing returns to the step S53 to be repeated. In this case, the document in which the processing of the step S53 and the step S54 is not executed is defined as the document d, and then processing advances.

On the other hand, when it is determined that the processing has been executed concerning all the documents included in the document set Dc (YES of the step S55), the word vector vpc is generated. That is, the word vector vpc is generated by totaling the word vectors vpd generated for the respective documents included in the document set Dc (the word vectors of the documents in the integrated category p).

Afterward, the existing category classification unit 142 divides the value of each dimension of the generated word vector vpc by a norm |vpc| of the word vector vpc to normalize the value (step S56). As a result, the word vector vpc is a vector whose norm is 1.

As described above, the word vector vpc is generated as an average vector that expresses the characteristics of the documents belonging to a child category c of the integrated category p, in the child category c of the integrated category p.

Again returning to FIG. 14, the existing category classification unit 142 executes the following processing of step S13 to step S22 concerning each of the documents d classified into the integrated category p.

The existing category classification unit 142 executes initialization processing (step S13). In this initialization processing, the existing category classification unit 142 defines a value of aforementioned smax as 0 (i.e., smax=0) and aforementioned cmax as none.

The existing category classification unit 142 executes the following processing of the step S14 to the step S18 concerning each child category (hereinafter, written as the child category c) of the integrated category p.

The existing category classification unit 142 calculates a similarity (hereinafter, written as a similarity s) between the document d and the child category c of the integrated category p (step S14). This similarity s is calculated by, for example, a cosine of the word vector vpd of the document d of the classification object and the word vector vpc of the child category c of the integrated category p.

The existing category classification unit 142 determines whether or not the calculated similarity s is a predetermined value (hereinafter, written as a threshold value sth) or more (step S15). It is to be noted that the threshold value sth may be 0.

When it is determined that the similarity s is the threshold value sth or more (YES of the step S15), the existing category classification unit 142 determines whether or not the calculated similarity s is larger than the abovementioned smax (step S16).

When it is determined that the similarity s is larger than smax (YES of the step S16), the existing category classification unit 142 substitutes the child category c for the abovementioned cmax (i.e., cmax=c) (step S17).

In addition, the existing category classification unit 142 substitutes s for smax (i.e., smax=s) (step S18).

The existing category classification unit 142 determines whether or not the abovementioned processing of the step S14 to the step S18 has been executed concerning all the child categories c (step S19).

When it is determined that the processing is not executed concerning all the child categories c (NO of the step S19), the processing returns to the abovementioned step S14 to be repeated. In this case, the child category in which the processing of the step S14 to the step S18 is not executed is defined as the child category c, and then processing advances.

It is to be noted that when it is determined in the abovementioned step S15 that the similarity s is not the threshold value sth or more and when it is determined in the step S16 that the similarity s is smax or less, the processing of the step S19 is executed.

When the processing is executed concerning all the child categories c as described above, the category having the highest similarity to (the word vector of) the document d among all the child categories c is cmax.

When it is determined that the processing has been executed concerning all the child categories c (YES of the step S19), the existing category classification unit 142 determines whether or not cmax satisfying the conditions is present (step S20). That is, the existing category classification unit 142 determines whether or not the child category c is present which satisfies the conditions in the abovementioned processing of the step S15 and the step S16, i.e., which is the threshold value sth or more and in which the similarity s larger than smax is calculated. It is to be noted that, when it is determined that cmax satisfying the conditions is not present (NO of the step S20), the processing advances to aforementioned processing of step S23.

When it is determined that cmax satisfying the conditions is present (YES of the step S20), the existing category classification unit 142 classifies the document d into the cmax (i.e., the child category c having the highest similarity to the document d) (step S21).

Next, the existing category classification unit 142 calculates the word vector of the child category c (cmax) having the highest similarity to the document d again (step S22). This word vector is generated by the abovementioned processing shown in FIG. 17.

Subsequently, it is determined whether or not the abovementioned processing of the step S13 to the step S22 has been executed concerning all the documents classified into the integrated category p (step S23).

When it is determined that the processing is not executed concerning all the documents classified into the integrated category p (NO of the step S23), the processing returns to the step S13 to be repeated. In this case, the document in which the processing of the step S13 to the step S22 is not executed is defined as the document d, and then processing advances.

On the other hand, when it is determined that the processing has been executed concerning all the documents classified into the integrated category p (YES of the step S23), and the processing is ended.

The abovementioned processing of the step S11 to the step S23 is the detail of the processing of the step S3 by the existing category classification unit 142.

Figure 18:
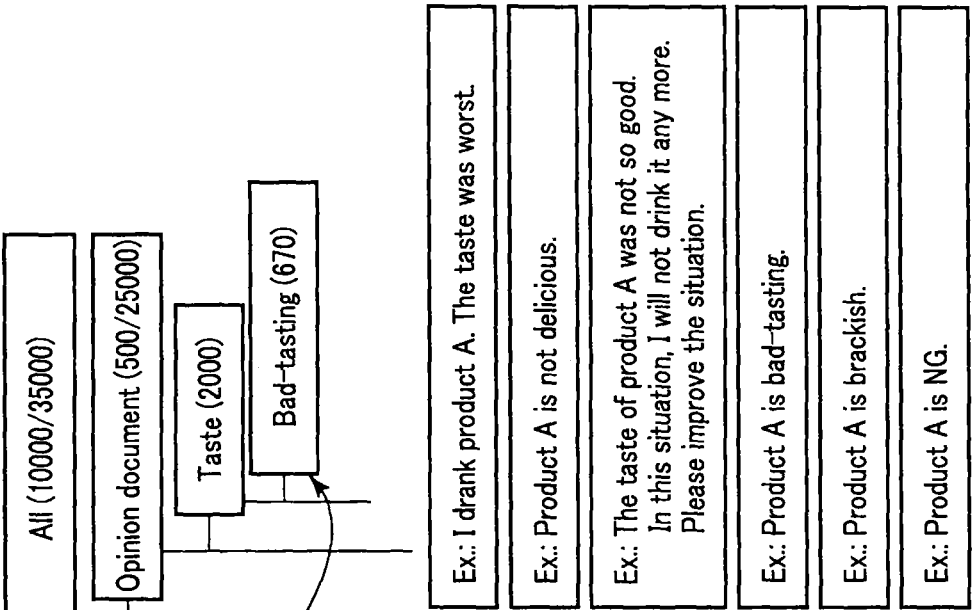
FIG. 18 is a schematic view showing one example of processing in which the opinion document is classified into one of existing categories by the existing category classification unit according to the embodiment.
Figure 18:
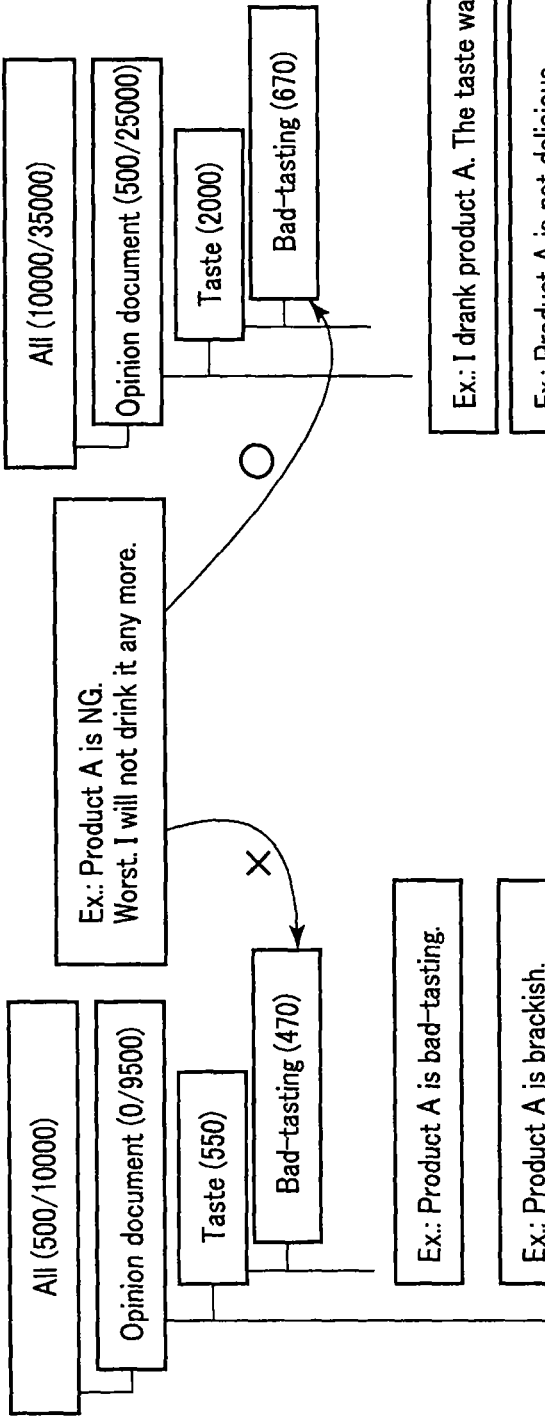

FIG. 18 is a schematic view showing one example of processing in which the opinion document is classified into one of the existing categories by the existing category classification unit 142. In the example shown in FIG. 18, there is shown an example where the opinion document saying "product A is NG. Worst. I will not drink it twice" is classified into the category of the category name "bad-tasting" of the existing category. In a conventional classifying function, generally, a document corresponding to a second document stored in a storage unit corresponding to the second document storage unit 110 is employed as the training document (i.e., the same type of document of the storage unit in which the analysis object is stored is employed as the training document), and hence, in the example shown in FIG. 18, the matching word is only "NG", and the opinion document cannot be classified into the category of the category name "bad-tasting" sometimes. On the other hand, the existing category classification unit 142 employs the first document and second document stored in the first document storage unit 100 and the second document storage unit 110 as the training documents. Therefore, in the example shown in FIG. 18, words such as "taste", "twice" and "will not drink" are present as the matching words in addition to "NG", and hence, the opinion document can be classified into the category of the category name "bad-tasting" at a higher accuracy as compared with the conventional function.

Again returning to FIG. 11, the document clustering unit 143 of the second document classification unit 140 defines, as the object, the opinion document that is not classified into any one of the existing categories by the existing category classification unit 142, and executes the document clustering processing for the object (step S4).

Figure 19:
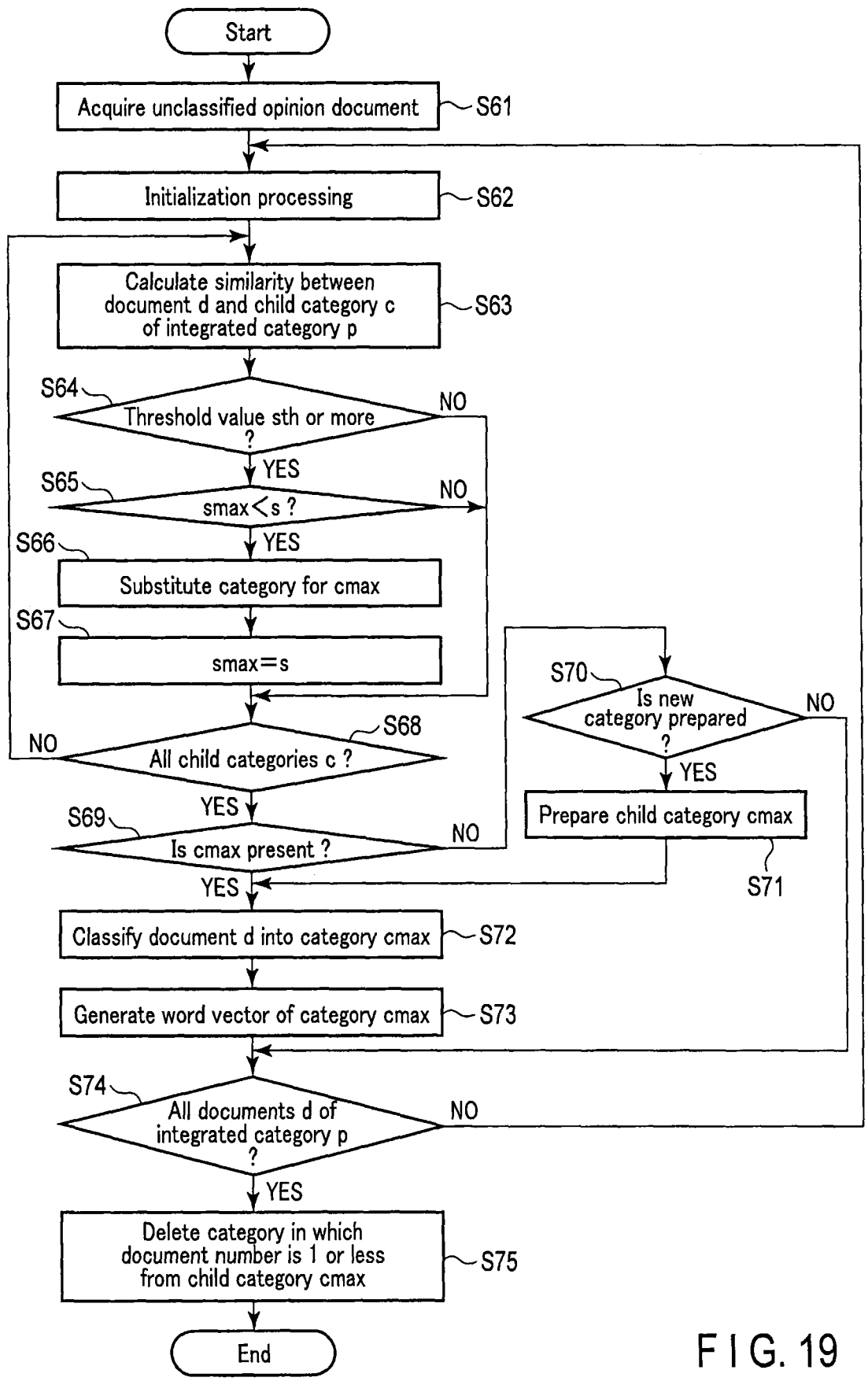
FIG. 19 is a flowchart showing one example of an operation of a document clustering unit according to the embodiment.

Here, details of the abovementioned processing of the step S4 by the document clustering unit 143 are described with reference to FIG. 19.

First, the document clustering unit 143 acquires the opinion document that is not classified into any one of the existing categories by the existing category classification unit 142 (i.e., the unclassified second document) (step S61).

The document clustering unit 143 executes the following processing of step S62 to step S73 concerning each of the opinion documents acquired in the abovementioned processing of the step S61.

The document clustering unit 143 executes initialization processing (step S62). In this initialization processing, the document clustering unit 143 defines a value of smax as 0 (i.e., smax=0) and cmax as none.

The document clustering unit 143 executes the following processing of the step S63 to the step S67 concerning each of newly prepared child categories c among the child categories c of the integrated category p. It is to be noted that the newly prepared child category c among the child categories c of the integrated category p is not generated when the document clustering processing is first executed, and is generated by aforementioned processing of the step S71.

The document clustering unit 143 calculates a similarity between the document d and the new child category c (step S63). This similarity s is calculated by, for example, a cosine of the word vector vpd of the document d in the integrated category p and the word vector vpc of the new child category c.

The document clustering unit 143 determines whether or not the calculated similarity s is a predetermined threshold value sth or more (step S64). It is to be noted that the threshold value sth may be 0.

When it is determined that the similarity s is the threshold value sth or more (YES of the step S64), the document clustering unit 143 determines whether or not the calculated similarity s is larger than the abovementioned smax (step S65).

When it is determined that the similarity s is larger than smax (YES of the step S65), the document clustering unit 143 substitutes the new child category c for the abovementioned cmax (i.e., cmax=c) (step S66).

In addition, the document clustering unit 143 substitutes s for smax (i.e., smax=s) (step S67).

The document clustering unit 143 determines whether or not the abovementioned processing of the step S63 to the step S67 has been executed concerning all the new child categories c (step S68).

When it is determined that the processing is not executed concerning all the new child categories c (NO of the step S68), the processing returns to the abovementioned step S63 to be repeated. In this case, the new child category in which the processing of the step S63 to the step S67 is not executed is defined as the new child category c, and then processing advances.

It is to be noted that when it is determined in the abovementioned step S64 that the similarity s is not the threshold value sth or more and when it is determined in the step S65 that the similarity s is smax or less, the processing of the step S68 is executed.

When the processing is executed concerning all the new child categories c in this manner, the category having the highest similarity to (the word vector of) the document d among all the new child categories c becomes cmax.

When it is determined that the processing has been executed concerning all the new child categories c (YES of the step S68), the document clustering unit 143 determines whether or not cmax satisfying the conditions is present (step S69). That is, the document clustering unit 143 determines whether or not the new child category c is present which satisfies the conditions in the abovementioned processing of the step S64 and the step S65, i.e., which is the threshold value sth or more and in which the similarity s larger than smax is calculated.

When it is determined that cmax satisfying the conditions is not present (NO of the step S69), the document clustering unit 143 determines whether or not a request to newly prepare the child category c has been received from the user via, for example, the keyboard 12 or the mouse 13 (step S70). It is to be noted that when it is determined that the request to newly prepare the child category c is not received (NO of the step S70), the processing advances to aforementioned processing of step S74.

When it is determined that the request to newly prepare the child category c is received (YES of the step S70), the document clustering unit 143 prepares cmax as the new child category c that is the category having the highest similarity to the document d (step S71).

When it is determined that cmax is present (YES of the step S70) or when the processing of the step S71 is executed, the document clustering unit 143 classifies the document d into cmax (i.e., the new child category c having the highest similarity to the document d) (step S72).

Next, the document clustering unit 143 calculates the word vector of the new child category c (cmax) having the highest similarity to the document d again (step S73). The word vector of cmax is generated by the abovementioned processing shown in FIG. 17. That is, the word vector of cmax can be calculated by using the word vector (hereinafter, written as a word vector vpcmax) of cmax before the document d is classified into the new child category c and the word vector vpd. Further specifically, when the number of the documents which cmax has before the document d is classified into the new child category c is |Dcmax|, a word vector |Dcmax|*vpcmax+vpd is normalized by a norm of the vector, so that the word vector whose size is set to 1 can be defined as a new word vector of cmax.

The document clustering unit 143 determines whether or not the abovementioned processing of the step S62 to the step S73 has been executed concerning all the documents acquired in the abovementioned processing of the step S61 (step S74).

When it is determined that the processing is not executed concerning all the acquired documents (NO of the step S74), the processing returns to the step S62 to be repeated. In this case, the document in which the processing of the step S62 to the step S73 is not executed is defined as the document d, and then processing advances.

On the other hand, when it is determined that the processing has been executed concerning all the acquired documents (YES of the step S74), the document clustering unit 143 deletes the new child category c in which the number of the classified documents is 1 or less among the new child categories c prepared in the abovementioned processing of the step S71 (step S75), and the processing is ended.

The abovementioned processing of the step S61 to the step S75 is the detail of the abovementioned processing of the step S4 by the document clustering unit 143.

Figure 20:
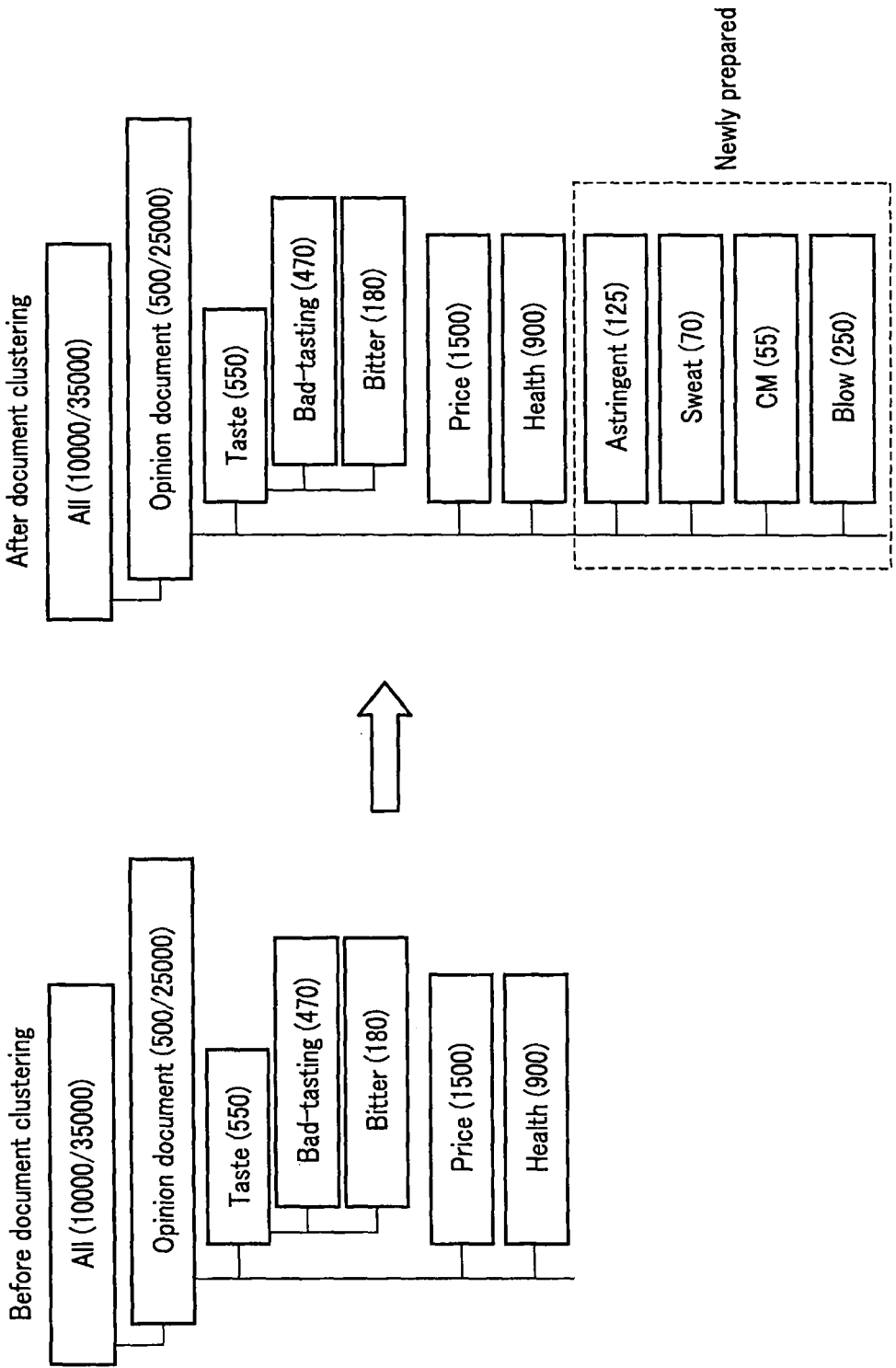
FIG. 20 is a schematic view showing one example of document clustering processing to be executed by the document clustering unit according to the embodiment.

FIG. 20 is a schematic view showing one example of the document clustering processing to be executed by the document clustering unit 143. In the example shown in FIG. 20, "astringent", "sweat", "CM" and "blow" are generated as new child categories.

Again returning to FIG. 11, the parent category determination unit 144 of the second document classification unit 140 defines the new child category c generated by the document clustering unit 143 as the object, and determines whether or not the child category c belongs (is subordinate) to one of the existing (parent) categories (step S5).

Here, details of the abovementioned processing of the step S5 by the parent category determination unit 144 will be described with reference to FIG. 21.

The parent category determination unit 144 executes the following processing of steps S81 to S90 concerning each of the new child categories c generated by the document clustering unit 143.

First, the parent category determination unit 144 executes initialization processing (step S81). In this initialization processing, the parent category determination unit 144 defines a value of smax as 0 (i.e., smax=0) and cmax as none.

The parent category determination unit 144 executes the following processing of the step S82 to the step S86 concerning each of categories (hereinafter, written as categories ca) of a first class.

The parent category determination unit 144 calculates a similarity between the new child category c and the category ca (step S82). This similarity s is calculated by, for example, a cosine of the word vector vpc of the new child category c and a word vector vpca of the category ca.

Subsequently, the parent category determination unit 144 determines whether or not the calculated similarity s is the predetermined threshold value sth or more (step S83). It is to be noted that the threshold value sth may be 0.

When it is determined that the similarity s is the threshold value sth or more (YES of the step S83), the parent category determination unit 144 determines whether or not the calculated similarity s is larger than the abovementioned smax (step S84).

When it is determined that the similarity s is larger than smax (YES of the step S84), the parent category determination unit 144 substitutes the new child category c for the abovementioned cmax (i.e., cmax=c) (step S85).

In addition, the parent category determination unit 144 substitutes s for smax (i.e., smax=s) (step S86).

The parent category determination unit 144 determines whether or not the abovementioned processing of the step S82 to the step S86 has been executed concerning all the categories ca (step S87).

When it is determined that the processing is not executed concerning all the categories ca (NO of the step S87), the processing returns to the abovementioned step S82 to be repeated. In this case, the category in which the processing of the step S82 to the step S86 is not executed is defined as the category ca, and then processing advances.

It is to be noted that when it is determined in the abovementioned step S83 that the similarity s is not the threshold value sth or more and when it is determined in the step S84 that the similarity s is smax or less, the processing of the step S87 is executed.

When the processing is executed concerning all the categories ca in this manner, the category ca having the highest similarity to (the word vector of) the new child category c among all the categories ca becomes cmax.

When it is determined that the processing has been executed concerning all the categories ca (YES of the step S87), the parent category determination unit 144 determines whether or not cmax satisfying the conditions is present (step S88). That is, the parent category determination unit 144 determines whether or not the category ca is present which satisfies the conditions in the abovementioned processing of the step S83 and the step S84, i.e., which is the threshold value sth or more and in which the similarity s larger than smax is calculated. It is to be noted that when it is determined that cmax satisfying the conditions is not present (NO of the step S88), the processing advances to aforementioned processing of step S91.

When it is determined that cmax satisfying the conditions is present (YES of the step S88), the parent category determination unit 144 classifies the new child category c into cmax (the category ca having the highest similarity to the new child category c) (step S89).

Next, the parent category determination unit 144 calculates the word vector of cmax (i.e., the category ca having the highest similarity to the new child category c) again (step S90). The word vector of cmax is generated by the abovementioned processing shown in FIG. 17.

The parent category determination unit 144 determines whether or not the abovementioned processing of the step S81 to the step S90 has been executed concerning all the new child categories c (step S91).

When it is determined that the processing is not executed concerning all the new child categories c (NO of the step S91), the processing returns to the step S81 to be repeated. In this case, the new child category in which the processing of the step S81 to the step S90 is not executed is defined as the new child category c, and then processing advances.

On the other hand, when it is determined that the processing has been executed concerning all the new child categories c (YES of the step S91), the processing is ended.

The abovementioned processing of the step S81 to the step S91 is the detail of the processing of the above step S5 by the parent category determination unit 144.

Figure 22:
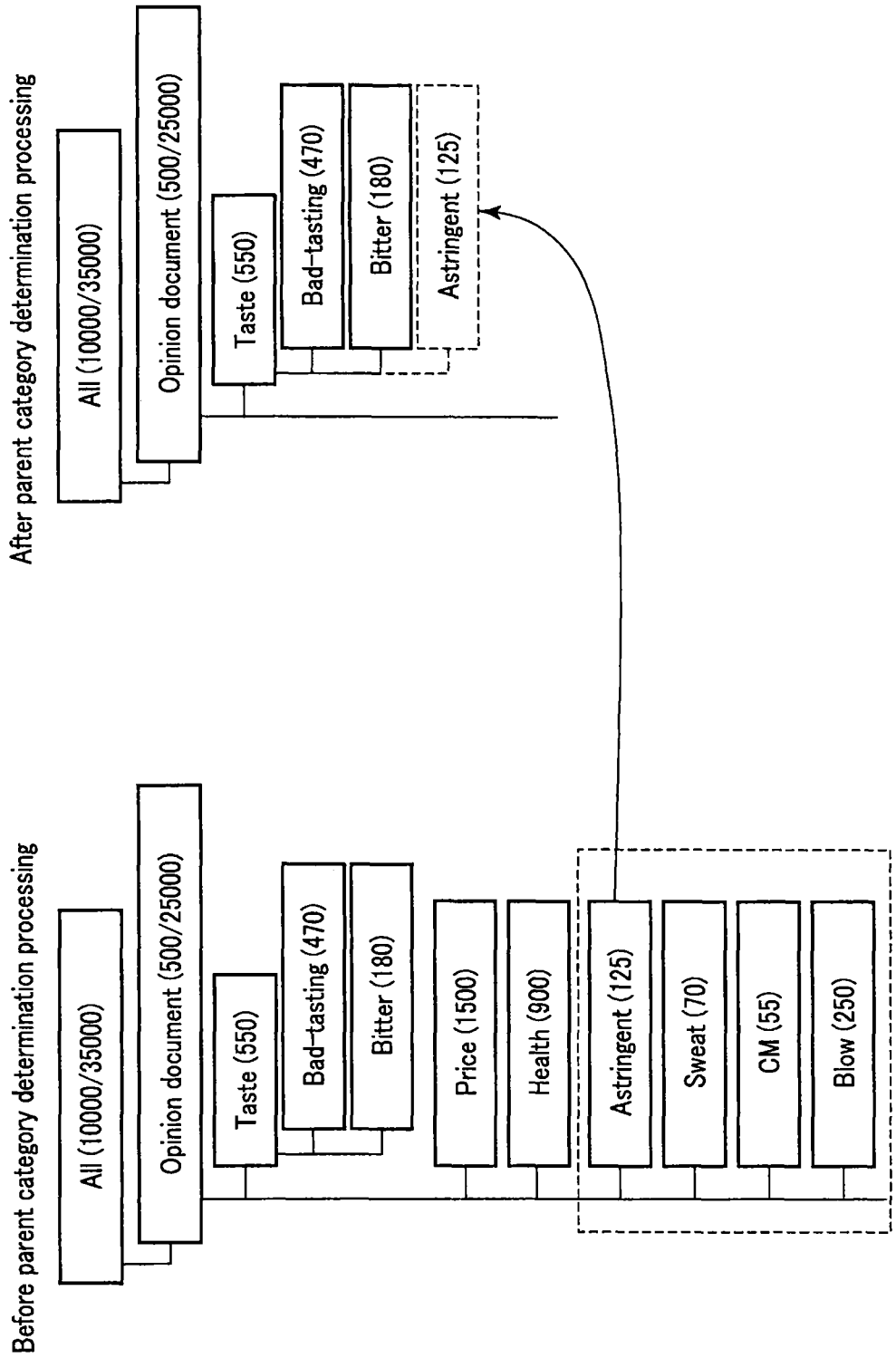
FIG. 22 is a schematic view showing one example of processing in which a new child category is classified into one of existing parent categories by the parent category determination unit according to the embodiment.

FIG. 22 is a schematic view showing one example of processing in which the new child category is classified into one of the existing parent categories by the parent category determination unit 144. In the example shown in FIG. 22, the parent category determination unit 144 determines that it is appropriate that a category name "astringent" of the new child category belongs right under a category name "taste", and classifies the category name "astringent" (to be subordinate) right under the category name "taste".

Again returning to FIG. 11, the new category determination unit 145 defines, as the object, the category that does not belong to any one of the existing parent categories as a result of the determination processing by the parent category determination unit 144, and determines whether or not the category is a category concerning new content (step S6).

Figure 23:
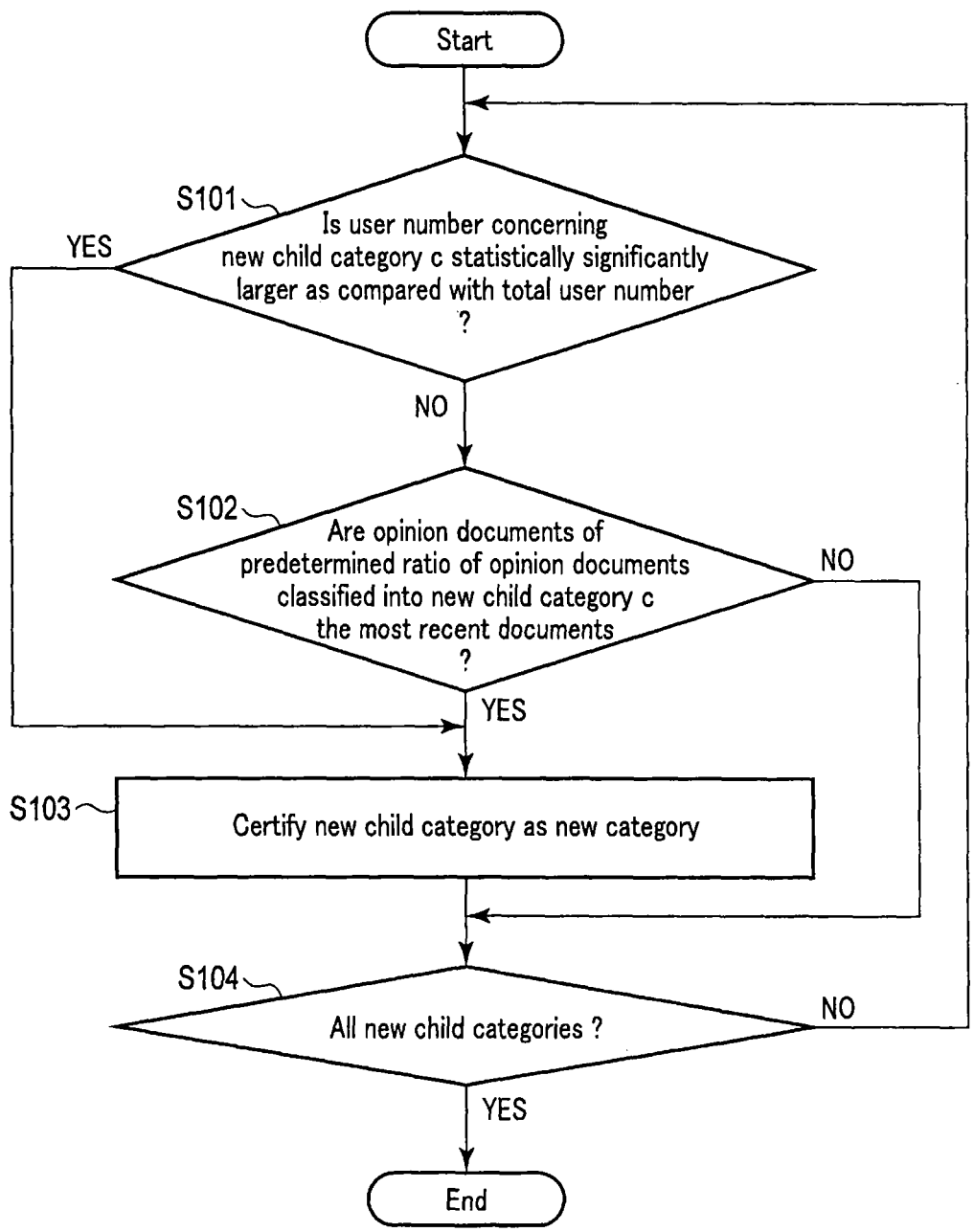
FIG. 23 is a flowchart showing one example of an operation of a new category determination unit according to the embodiment.

Here, details of the abovementioned processing of the step S6 by the new category determination unit 145 are described with reference to FIG. 23.

The new category determination unit 145 executes the following processing of step S101 to step S103 concerning each of the new child categories c determined as the category that does not belong to any one of the existing parent categories as a result of the determination processing by the parent category determination unit 144.

First, the new category determination unit 145 defines, as the object, the new child category c that does not belong to any one of the existing parent categories as the result of the determination processing by the parent category determination unit 144, and determines whether or not a ratio of the number of the users who prepared the opinion documents belonging to the new child category c to the number of the users who prepared the first documents and second documents extracted by the search unit 131 of the user interface unit 130 is in excess of a predetermined ratio (step S101). That is, the new category determination unit 145 determines whether or not, of the number of the users who prepared the first documents and second documents of the analysis objects, the number of the users who prepared the opinion documents of the content concerning the new child category c is statistically significantly larger as compared with the number of the users who prepared the opinion documents classified into the categories other than the new child category c.

It is to be noted that when it is determined that the number of the users is significantly large (YES of the step S101), the processing advances to the aforementioned step S103.

When it is determined that the number of the users is not significantly large (NO of the step S101), the new category determination unit 145 defines, as the object, the new child category c that does not belong to any one of the existing parent categories as the result of the determination processing by the parent category determination unit 144, and determines whether or not the opinion documents of the predetermined ratio of the opinion documents belonging to the new child category c are documents most recently stored in the second document storage unit 110 (step S102). When it is determined that the document is not the document most recently stored in the second document storage unit 110 (NO of the step S102), the processing advances to aforementioned step S104.

It is to be noted that, here, as a technique of classifying the most recent documents and the documents other than the most recent documents, there is used, for example, a technique of classifying the documents at ratios of 50% or a technique of designating a desirable date to classify the documents on or after the designated date as the most recent documents, but the technique is not especially limited to these examples.

Additionally, an example of a statistic investigation technique for use in the abovementioned processing of the step S101 or the abovementioned processing of the step S102 is a chi-square test. In the chi-square test, a chi-square statistic (x) calculated by using the following equation becomes statistically significant when the statistic is smaller than a chi-square distribution (3.84) in which a degree of freedom is 2 and a significance level is 5% or a chi-square distribution (6.63) in which a degree of freedom is 2 and a significance level is 1%, and the statistic does not become statistically significant when the statistic is large.

$$X = \frac{\left(x11 - \frac{a1 \times b1}{n}\right)^2}{\frac{a1 \times b1}{n}} + \frac{\left(x12 - \frac{a1 \times (n-b1)}{n}\right)^2}{\frac{a1 \times (n-b1)}{n}} + \frac{\left(x21 - \frac{(n-a1) \times b1}{n}\right)^2}{\frac{(n-a1) \times b1}{n}} + \frac{\left(x22 - \frac{(n-a1) \times (n-b1)}{n}\right)^2}{\frac{(n-a1) \times (n-b1)}{n}}$$

[Equation 1]

It is to be noted that in the processing of the step S101, x11 of the above equation is an inherent user number of the users who prepared the opinion documents classified into the new child category c determined as the category that does not belong to any one of the existing parent categories by the parent category determination unit 144, and b1 of the above equation is a total inherent user number of the users who prepared the documents as the documents of the analysis objects.

Additionally, in the processing of the step S102, x11 of the above equation is the number of the most recent opinion documents classified into the new child category c determined as the category that does not belong to any one of the existing parent categories by the parent category determination unit 144, and b1 of the above equation is the number of the most recent documents of the analysis objects.

Furthermore, a1 of the above equation is the number of the documents belonging to the new child category determined as the category that does not belong to any one of the existing categories by the parent category determination unit 144 in the processing of each of the step S101 and the step S102, and n of the above equation is the number of all the documents of the analysis objects.

In addition, x12 of the above equation is "a1-x11", x21 of the above equation is "b1-x11", and x22 of the above equation is "n-a1-x21".

Again returning to FIG. 23, when it is determined in the processing of the step S101 that the number of the users is significantly large (YES of the step S101) or when it is determined that the documents have most recently been stored in the second document storage unit 110 (YES of the step S102), the new category determination unit 145 adds the new child category c as a new category to the classification system comprising the existing categories (step S103).

The new category determination unit 145 determines whether or not the abovementioned processing of the step S101 to the step S103 has been executed concerning all the new child categories c determined as the categories that do not belong to any one of the existing parent categories by the parent category determination unit 144 (step S104).

When it is determined that the processing is not executed concerning all the new child categories c (NO of the step S104), the processing returns to the step S101 to be repeated. In this case, the new child category in which the processing of the step S101 to the step S103 is not executed is defined as the new child category c, and then processing advances.

On the other hand, when it is determined that the processing has been executed concerning all the new child categories c (YES of the step S104), the processing is ended.

The abovementioned processing of the step S101 to the step S104 is the detail of the above processing of the step S6 by the new category determination unit 145.

FIG. 24 is a schematic view showing one example of processing in which the new child category is certified as the new category by the new category determination unit 145. In the example shown in FIG. 24, among new child categories "sweat", "CM" and "blow" determined as the categories that are not subordinate to any one of the existing categories by the parent category determination unit 144, the categories of category names "sweat" and "CM" are certified as the new categories, and the category of category name "blow" is certified as the category to which the documents other than the opinion documents belong.

Again returning to FIG. 11, the second document classification unit 140 outputs the classification result by the abovementioned processing of the step S2 to the step S6 to the visualization unit 132 of the user interface unit 130 (step S7), and the processing is ended.

FIG. 25 is a schematic view showing a screen example where the result of the classification processing by the second document classification unit 140 is displayed in the display 15 via the visualization unit 132 of the user interface unit 130. In the example shown in FIG. 25, the category names "astringent", "sweat" and "CM" are emphasized and displayed as the newly generated categories.

According to the abovementioned present embodiment, even when the documents transmitted to the social media (the second documents) include the documents in which a casual expression (e.g., "brackish" or the like) is used, the documents can appropriately be analyzed, and the documents can appropriately be classified in the classification system.

It is to be noted that the abovementioned technique described in each embodiment can be stored and distributed as a program executable by a computer in a storage medium such as a magnetic disc (Floppy™ disc, hard disc or the like), an optical disc (CD-ROM, DVPD or the like), a magnetic optical disc (MO), or a semiconductor memory.

Additionally, this storage medium may take any configuration as a storage form of the medium, as long as the program can be stored in the storage medium and the storage medium is readable by the computer.

In addition, an OS (operating system) that operates on the computer on the basis of an instruction of the program installed from the storage medium to the computer, MW (middleware) such as database management software or network software or the like may execute a part of the processing to realize the above embodiment.

Furthermore, the storage medium in each embodiment is not limited to a medium independent of the computer, and also includes a storage medium in which the program transmitted via LAN, the Internet or the like is downloaded to be stored or temporarily stored.

Additionally, the number of the storage media is not limited to one, and a case where the processing in each of the above embodiments is executed from the media is also included in the storage media in the present invention, and a medium constitution may be any constitution.

It is to be noted that the computer in each embodiment executes processing in each of the above embodiments on the basis of the program stored in the storage medium, and may have any constitution such as a single device such as a personal computer or a system in which the devices are connected to a network.

In addition, the computer in each embodiment is not limited to the personal computer, and includes an arithmetic processing unit contained in an information processing apparatus, a microcomputer or the like, and the computer is a generic term of an apparatus or a device which is capable of realizing the function of the present invention by the program.

It is to be noted that several embodiments of the present invention have been described, but these embodiments are merely illustrated as examples, and are not intended to limit the scope of the invention. These novel embodiments can be implemented in various other configurations, and various omissions, replacements and changes can be performed without departing from the gist of the invention. These embodiments and modifications are included in the scope or gist of the invention, and are included in the inventions described in the claims and equivalent scopes to the claims.

The invention claimed is:

1. A document analysis apparatus comprising:
   a first document storage circuit for storing first documents, the first documents including first words, wherein the first documents belong to respective categories constituting a hierarchical structure, and the first documents only include opinion documents for a desirable object;
   a second document storage circuit for storing second documents, the second documents including second words, and the second documents include the opinion documents for the desirable object and non-opinion documents, wherein at least one of the second documents is classified into a second category, which is one of the respective categories constituting the hierarchical structure;
   a document extraction circuit for extracting first extracted documents and second extracted documents from the first document storage circuit and the second document storage circuit, the first extracted documents and the second extracted documents satisfying a condition, wherein the condition is an input being accepted in response to an operation of a user;
   an opinion document classification circuit for defining, as training documents, the first extracted documents and the at least one of the second documents classified into the second category among the second extracted documents, and classifying, into the opinion documents and the non-opinion documents, at least another of the second documents that does not belong to the respective categories among the second extracted documents;
   an existing category classification circuit for defining, as the training documents, the stored first documents and the at least one of the second documents classified into the second category among the stored second documents, and classifying the classified opinion documents into one of the respective categories to which the training documents belong;
   a document clustering circuit for defining, as an object, another opinion document that is not classified into any one of the respective categories by the existing category classification circuit, executing document clustering processing for the object, preparing a new category, and classifying the another opinion document into the new category;
   a category determination circuit for defining, as the training documents, a first category to which the stored first documents belong and the second category, and determining whether or not the new category becomes a child category that is subordinate to one of the first and second categories to which the training documents belong, wherein new first documents and new second documents are successively stored in the first document storage circuit and the second document storage circuit respectively;

a first new category determination circuit for determining whether or not the opinion documents of a predetermined ratio of the opinion documents belonging to the new category are the latest documents stored in the second document storage circuit, when the category determination circuit determines that the new category does not become the child category;

a first new category certification circuit for certifying the new category as one of the respective categories constituting the hierarchical structure, when the first new category determination circuit determines that the opinion documents are the latest documents stored in the second document storage circuit;

a second new category determination circuit for determining whether or not a ratio of a first number of the users who prepared the opinion documents belonging to the new category to a second number of the users who prepared the first extracted documents and the second extracted documents is in excess of the predetermined ratio, when the category determination circuit determines that the prepared new category does not become the child category; and a second new category certification circuit for certifying the prepared new category as one of the respective categories constituting the hierarchical structure, when the second new category determination circuit determines that the ratio is in excess of the predetermined ratio.

2. A non-transitory computer-readable storage medium including a program of instructions thereon that, when executed by circuitry, causes the circuitry to perform a method comprising:

storing first documents, the first documents including first words, wherein the first documents belong to respective categories constituting a hierarchical structure, and the first documents only include opinion documents for a desirable object;

storing second documents, the second documents including second words, and the second documents include the opinion documents for the desirable object and non-opinion documents, wherein at least one of the second documents is classified into a second category, which is one of the respective categories constituting the hierarchical structure;

extracting the first documents and the second documents, the first extracted documents and the second extracted documents satisfying a condition, wherein the condition is an input being accepted in response to an operation of a user;

defining, as training documents, the first extracted documents and the at least one of the second documents classified into the second category among the second extracted documents, and classifying, into the opinion documents and the non-opinion documents, at least another of the second documents that does not belong to the respective categories among the second extracted documents;

defining, as the training documents, the stored first documents and the at least one of the second documents classified into the second category among the stored second documents, and classifying the classified opinion documents into one of the respective categories to which the training documents belong;

defining, as an object, another opinion document that is not classified into any one of the respective categories, executing document clustering processing for the object, preparing a new category, and classifying the another opinion document into the new category;

defining, as the training documents, a first category to which the stored first documents belong and the second category and determining whether or not the new category becomes a child category that is subordinate to one of the first and second categories to which the training documents belong, wherein new first documents and new second documents are successively stored in a first storage circuit of the circuitry and a second storage circuit of the circuitry respectively;

determining whether or not the opinion documents of a predetermined ratio of the opinion documents belonging to the new category are the latest documents stored in the second storage circuit, when the circuitry determines that the new category does not become the child category;

certifying the new category as one of the respective categories constituting the hierarchical structure, when the opinion documents are the latest documents stored in the second storage circuit;

determining whether or not a ratio of a first number of the users who prepared the opinion documents belonging to the new category to a second number of the users who prepared the first extracted documents and the second extracted documents is in excess of the predetermined ratio, when the circuitry determines that the prepared new category does not become the child category; and certifying the prepared new category as one of the categories constituting the hierarchical structure, when the circuitry determines that the ratio is in excess of the predetermined ratio.

* * * * *